(12) United States Patent
Drako et al.

(10) Patent No.: US 10,674,116 B2
(45) Date of Patent: *Jun. 2, 2020

(54) SYSTEM AND APPARATUS FOR SHARING PRIVATE VIDEO STREAMS WITH FIRST RESPONDERS

(71) Applicants: Dean Drako, Austin, TX (US); Steven Roskowski, Los Gatos, CA (US); Timothy Duncan, Round Rock, TX (US)

(72) Inventors: Dean Drako, Austin, TX (US); Steven Roskowski, Los Gatos, CA (US); Timothy Duncan, Round Rock, TX (US)

(73) Assignee: EAGLE EYE NETWORKS, INC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,917

(22) Filed: May 7, 2019

(65) Prior Publication Data

US 2019/0342526 A1 Nov. 7, 2019

Related U.S. Application Data

(63) Continuation-in-part of application No. 15/253,871, filed on Sep. 1, 2016, now Pat. No. 10,505,923.

(Continued)

(51) Int. Cl.
*H04N 7/18* (2006.01)
*G06Q 50/26* (2012.01)
*H04L 29/06* (2006.01)

(52) U.S. Cl.
CPC ............. *H04N 7/181* (2013.01); *G06Q 50/26* (2013.01); *H04L 63/0227* (2013.01); *H04L 65/4076* (2013.01)

(58) Field of Classification Search
CPC ....................................... H04N 7/181
(Continued)

(56) References Cited

U.S. PATENT DOCUMENTS 7,114,128 B2 * 9/2006 Koppolu ............... G06F 16/748
715/781
8,300,098 B1 * 10/2012 Gruttadauria ............ H04N 5/76
348/143

(Continued)

*Primary Examiner* — Leron Beck
(74) *Attorney, Agent, or Firm* — Patentry; Peter G. H. Hwang

(57) ABSTRACT

A video surveillance service shares image streams with first responder agencies in the event of emergency. Nominated agencies establish access credentials at the surveillance service data center. A camera is shared by a customer administrator's selection of permissions on each camera via privileged web-browser or mobile device. Permissions enable selection by static meta data such as type, audio, location, motion, recognition, PTZR, spectrum, and epoch. Video streams of present and past epochs are controlled by ranges of time. A responding agency receives an electronic notification from the administrator to present their access credential and a handle for each shared camera of interest. A notification may be customized for each responding agency and each event by dynamically generating a link to a secure webserver which records geo-location or network identifiers for validation. Video servers include virtual machines dedicated to each responding agency but controlled by a customer administrator.

2 Claims, 20 Drawing Sheets

Related U.S. Application Data

(60) Provisional application No. 62/305,523, filed on Mar. 8, 2016.

(58) Field of Classification Search
USPC .......................................................... 348/159
See application file for complete search history.

(56) References Cited

U.S. PATENT DOCUMENTS

| | | | | |
|---|---|---|---|---|
| 8,374,348 | B2* | 2/2013 | Lecomte | H04L 29/06027 380/216 |
| 8,520,072 | B1* | 8/2013 | Slavin | G08B 13/19684 348/143 |
| 9,462,028 | B1* | 10/2016 | Levinson | H04L 63/08 |
| 2006/0123238 | A1* | 6/2006 | Kacker | H04L 63/0442 713/185 |
| 2006/0165405 | A1* | 7/2006 | Kanai | H04N 5/23203 396/334 |
| 2007/0047950 | A1* | 3/2007 | Asami | H04N 1/00347 396/429 |
| 2008/0022297 | A1* | 1/2008 | Walter | H04L 29/06027 725/25 |
| 2009/0070477 | A1* | 3/2009 | Baum | H04N 21/2187 709/231 |
| 2012/0069131 | A1* | 3/2012 | Abelow | G06Q 10/067 348/14.01 |
| 2012/0113265 | A1* | 5/2012 | Galvin | H04N 7/181 348/159 |
| 2012/0143996 | A1* | 6/2012 | Liebald | G06F 3/0482 709/219 |
| 2013/0047227 | A1* | 2/2013 | Schultz | H04L 63/102 726/7 |
| 2014/0229835 | A1* | 8/2014 | Ravine | H04L 65/60 715/720 |
| 2015/0111524 | A1* | 4/2015 | South | H04W 4/90 455/404.2 |
| 2015/0168144 | A1* | 6/2015 | Barton | G01C 11/02 348/144 |
| 2015/0215586 | A1* | 7/2015 | Lasko | H04N 7/183 348/143 |
| 2015/0281550 | A1* | 10/2015 | Mito | H04M 5/23206 348/211.2 |

* cited by examiner

SYSTEM AND APPARATUS FOR SHARING PRIVATE VIDEO STREAMS WITH FIRST RESPONDERS

CROSS-REFERENCE TO RELATED APPLICATIONS

The present invention is a CONTINUATION IN PART application of Ser. No. 15/253,871 filed Sep. 1, 2016. The present application also benefits from provisional application 62/305,523 filed 8 Mar. 2016 which is incorporated by reference in its entirety. The present invention also benefits from the priority date of application Ser. No. 15/253,871 Filed: Sep. 1, 2016 which in incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The disclosure relates to over-the-air streaming of video surveillance images. More particularly, the methods and systems described herein relate to enabling emergency agencies to access private systems.

As is known, an emergency notification system is a method of facilitating the one-way dissemination or broadcast of messages to one or many groups of people, alerting them to a pending or existing emergency. Private surveillance networks containing cameras are intentionally not accessible to the public or government.

What is needed is a way to securely bridge from privately managed surveillance networks to first responders on site or enroute to an emergency.

BRIEF SUMMARY OF INVENTION

A private surveillance system notifies and activates emergency responders' access to video streams upon user command or automated triggering conditions.

Real-time video access is provided to first responders when a facility administrator activates access to share selected cameras. The first responder agencies are invited before hand to establish authentication credentials and download applications to their mobile video display apparatus.

Immediate situational awareness can be crucial when there are intruders, a fire, or other emerging situations. The insights that first responders gain from the clear, deep visibility can directly impact their actions—from necessary evacuations, to the specific protective measures they might take.

The system enables facility administrators to notify pre-designated local first responders of this availability: critical, real-time insights in the event of an emergency situation—while still retaining their facility's full daily privacy. Facility administrators first pre-designate their list of first responders who could be authorized to view shared video during emergencies. They will also deputize other internal personnel to be capable of activating the emergency video feed.

Each first responder agency will receive an invitational email. Upon acceptance of the terms and conditions, and establishing authentication, the first responders will download a mobile app so they will be able to instantly view the video while in transit during an emergency.

Video streams will continue to be private (unshared)—only accessible by the organization—until a facility administrator or deputy activates the access to shared cameras and selected permissioned streams of data or video. Permissions include display of static meta data such as location, motion sensing, spectrum, night vision, indoor, outdoor, type of camera, object recognition, facial recognition, heat sensing, and audio. Video streams of present and past epochs are controlled by selecting permissions and ranges. While the emergency video stream access is enabled, all designated first responders can view permissioned video using a web browser or on a secure mobile app.

Optionally, facility administrators may vector specific camera images to the first responders for viewing. All designated first responders could receive an email which includes direct links to the specified cameras. An open RESTful cloud video API allows the organization's physical security teams to integrate the first responder video emails and access with emergency notification systems they may have in place for first responders Each responding agency controls the distribution of the authentication credential within its department and affiliates.

Each responding agency may receive a uniquely customized notification with a dynamically generated link to a secure webserver which will record geo-location or network identifiers for validation or sanity checking.

The surveillance system data center will direct image streams from the shared cameras to the requesting browser after authentication e.g. user id and password, according to the permissions selected by the customer administrator. Video servers may include virtual machines dedicated to each responding agency. Any administrator of a customer in the region served by a responding agency may activate video streaming by the server through the end of the incident.

BRIEF DESCRIPTION OF THE SEVERAL VIEWS OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF INVENTION

Figure 1:
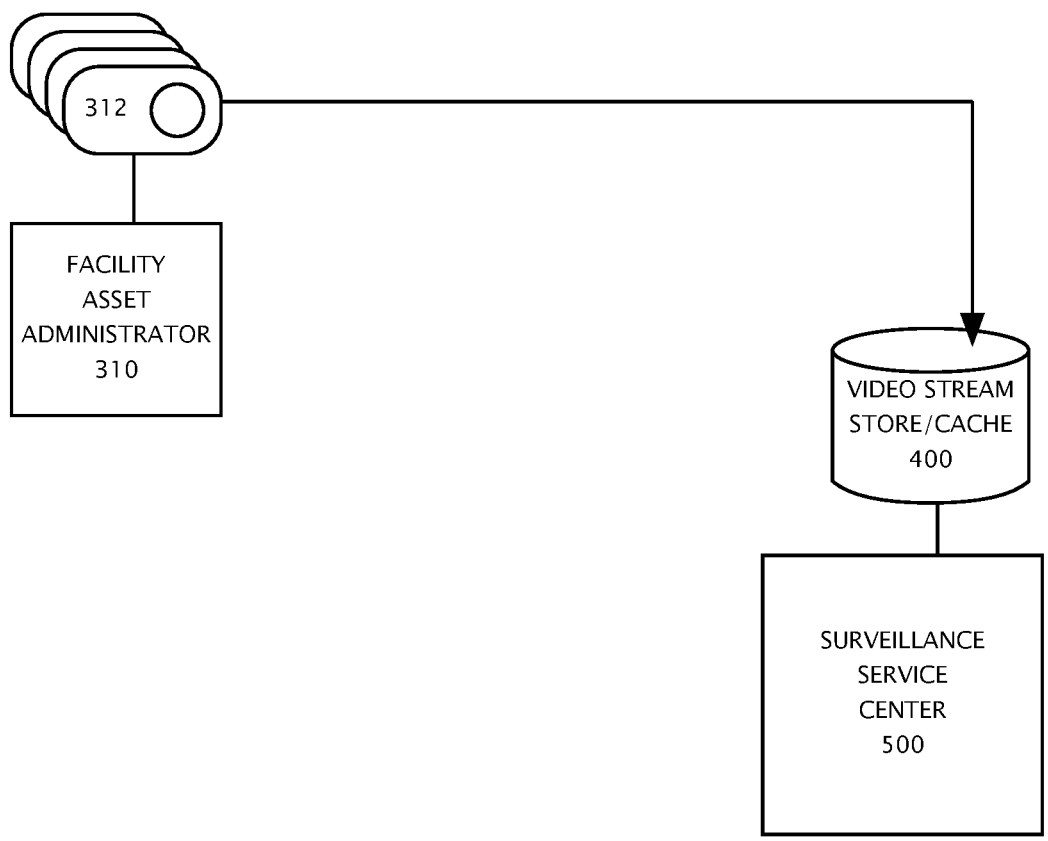
FIGS. 1-5 are block diagrams of a system with data flow among the facility, the surveillance service center and a first responder agency.

A customer of a video surveillance service wishes to share image streams with first responder agencies in the event of an emergency.

A surveillance facility asset administrator selectively stores camera parameters into an access permissions controller. This includes static meta data and a dynamic handle and video streaming boundaries for each camera intended to be selectably shared.

Previously nominated and enrolled responding agencies have established access credentials and configured their command center and mobile wireless equipment for live and historical downloads of images.

A selection of cameras will be shared when the administrator of the surveillance service customer sets permissions on each camera.

Upon notification by the administrator or a deputy, the responding agencies present their access credentials and requests image streams from a secure surveillance system server.

Permissions include display of static meta data such as type of camera, resolution, location, motion sensing, spectrum, night vision, audio, and facial or object recognition.

Video streams of present and past epochs are controlled by setting permissions and ranges.

A responding agency will receive an electronic notification from the administrator to present their access credential along with a handle for each shared camera. Non-limiting illustrative examples of an electronic notification includes a text, an email, a recorded voice message, and an IP packet e.g. UDP, or DNS query.

The handle for each camera may be dynamically synthesized for the event and discarded after the conclusion of the event. The administrator switches the permissions from static display to streaming the present epoch (live), a past epoch (history), or both.

Each responding agency may receive a customized notification with a dynamically generated link to a secure webserver which will record geo-location or network identifiers for validation or sanity checking.

In an embodiment, the notification to the responding agency includes a dynamically generated transient link to a secure webserver. The secure webserver records geo-location data or electronic identifiers from the browser and checks a white list or a black list. Is the request coming in from Ukraine via AOL? Is the request coming from an IPv6 host dedicated to a government network? There will be consequences, court orders, denial of service.

Non-limiting exemplary geo-location data and identifiers include LCID/CID Cell base station identifier, GPS coordinates, WiFi or Bluetooth signals, and IMEI.

In an embodiment, a notification message to a responding agency has an https link to an incident-unique login screen; reads and checks IPv6, IMEI, cell, GPS, WiFi, geo-location fence which can be checked against known responder agency IP/domain name.

Each responding agency may access video streams through a dedicated virtual machine which is popped by a facility administrator and remains active until the end of the incident.

In an embodiment, each responding agency has a dedicated browser which accesses a dedicated API operating in a virtual machine image which can be popped open or purged from a processor core in the surveillance system server. The browser may carry its own certificate.

A video surveillance service shares image streams with first responder agencies in the event of emergency. Each customer of a video surveillance service nominates responding agencies which support his facilities. The agencies are invited to establish access credentials stored at the surveillance service data center. This can be by simply picking a user id and password.

A present epoch is live streaming from the point the administrator makes a selection until it is deselected. A past epoch enables the responding agency to look back in time before the administrator's selection for a day, a week, all recorded video. A simplified setting consists of choosing among live, past, and both.

The responding agency logs in at a surveillance system service center.

A conventional surveillance system includes a facility asset administrator console (administrator) in control of a plurality of surveillance cameras. The cameras stream video to a video stream store or cache co-located at a secure and redundant surveillance service center which is remote from the facility and its cameras.

The invention consists of a shared camera meta data and stream permissions store which is under the control of the administrator. The administrator sets permissions on whether the camera is shared with at least one responding agency. The administrator controls how much of the camera meta data is visible to responding agencies such as its camera type, physical location, its resolution, color/monochrome, motion detection, audio and heat capabilities, indoor, outdoor, object or facial recognition, visible/non-visible ranges of spectrum, live streaming, and range of history availability e.g. past epoch/current epoch. The administrator can store several sets of permissions and switch among them or control each permission separately. Some cameras may not be shared at all and are not in this permissions store.

The invention also includes a responding agency account management system which includes the accounts and passwords for an agent to login at the surveillance service center.

The system also includes a plurality of responding agency window layouts under the control of the administrator. The layouts identify the cameras for each window pane, but the permissions store determines what is transmitted to the window pane. Statistics, meta data, or a still test image may be used as a default during setup and test.

The system also includes an electronic message system to inform a responding agency that permissions have been set for access and that the administrator requests that the agency use the permitted video streams.

The responder first logs into the service center, receives a window layout identifying cameras, and requests display of surveillance content. The service center checks user name and password, retrieves and provides the current window layout, and streams whatever the administrator has enabled to access the shared camera meta data and video streams according to the permissions in stores.

Live streaming or history is enabled by the administrator through changing a parameter within permissions store. A facility asset administrator may select a window layout designed for different types of emergencies or sections of a campus or have different windows for different agencies.

For economy and privacy, video streams captured at a surveillance system are compressed and encrypted for transmission and storage. Directly accessing the stream would display unintelligibly. The system does not enable permanent access to any camera at any time.

The first responder agencies pertinent to a private surveillance network are invited, validated, and verified. Their dispatchers are supported through a secure channel. A two step process is performed by the surveillance system administration team upon determining a need for first responders: video streams and time ranges are selected for exposure by synthesizing temporary links, and the API are allocated to certain first responder agencies.

Emergency personnel embedded within the facility such as a enterprise's own campus police, fire, and ambulance may have access to cameras at all times. Personnel notified of an emergency event receive an access control message from the surveillance system. One or more video streams are played in the mobile app. For a perimeter intrusion, the internal and external view of the alerting sensor is displayed, motion detection for nearby cameras is enabled and triggers streams. For a fire/smoke/CO alarm, a stored stream of the time prior to the event is also scrollable. For a 911 call, video streams of a geo-location surrounding the call origin are enabled. Video streams include an audio track in one embodiment.

The streams are encrypted to specific first responder personnel identities or roles. Emergency services dispatchers have the capability to add message recipients to the viewer list. In an embodiment, a surveillance system notifies on-call emergency responders and enables access to video streams upon user command or automated triggering conditions.

In an emergency situation determined by conditions or a system operator, viewing by first responders is enabled of camera streams. The streams may be live or stored. The storage may be retained at the camera location or at a higher security data center. The user interfaces for the system operator and the responder require not more than one click or button press.

The system includes role based mobile video player devices assigned to emergency services personnel, typically fire, medical, and law enforcement. The first responders thus survey the situation before/during/after their arrival onsite. The mobile video players may be body worn, hand held, or integrated into their vehicles and on a personal network.

Each dispatched responder receives a message when they are provided access to view camera images. The messages may be delivered by email, an internal mobile message system or commercial SMS and texting. In an emergency situation a trigger condition causes an access credential to be sent to dispatched personnel. A security system operator may with one touch of a web application, enables access control and transmits notification to pre-stored responders. This may be email addresses of individuals, roles, or aliases. The operator may select from a stored list of message recipients. A fire alarm by sensor or by manual operation may trigger creation and transmittal of the notification.

The video player device presents live and stored streams with or without audio, from camera locations pertinent to the type of emergency. The stored images are at both the location and a centralized data repository with high bandwidth. The video stream is provided by whichever location has the highest mobile bandwidth. It may be from an antenna within the premises or one well linked with the cellular data network.

Notification and credentials may be delivered by email, SMS, or encrypted messaging service. For large authorities and agencies, only the dispatched responder should receive an access credential. Of course the chain of command have supervisory privileges. Access may be restricted to devices within a geo-location boundary of the event location. To protect confidentiality, devices transmit their GPS or other location attribute and be within a geo-fence to receive mobile streaming images.

The invention notifies first responders of availability of surveillance assets. Mobile devices are communicatively linked to video streams at security premises. Selected video streams are live or replayed from storage. Access control may be triggered by system user, or automated by an event.

During installation and initialization, a bidirectional system validates first responders. First responders submit data to offer services for a region. A third party vets proposed first responders to confirm they are genuine and not malicious or fraudulent. The list of validated first responders is presented to surveillance system operators during a pre-designation session. First responders must provide credentials, references, and desired region and responsibilities to the vetting authority. Upon confirmation by the vetting party they are added to the list of valid first responders. Periodic tests confirm the continued validity.

In an embodiment, an apparatus presents an open nomination portal for agencies to self-nominate, potential service clients to suggest, customers to enroll, and the general public to offer contact information for first responder entities. A second portal presents a list of verified contact information which may be selected for pre-designation by system administrators for their facilities. A transformation of nominees to selectable first responders includes checking that the addresses are not relays, really connect to certified responder organizations, are not aliases or misleading names, and can be trusted to receive the emergency live video feed and refer it to actual sworn first responders.

Facility administrators pre-designate their list of first responders who will be authorized to view the video during emergencies. They will also authorize specific internal personnel to be capable of turning on the emergency live video feed.

To ensure that the connection is made, after the administrator submits the first responders name, organization and email address, each first responder will get a notification email and 'accept' the request. Typically they can download app and download instructions so first responders can view it remotely/in transit. The notification step allows the first responder to opt out of being a first responder to one or more surveillance systems. An unknown or undesired source of video streams can be refused by the first responder during the confirmation process.

Following set up, the video streams continue to be private—accessible by organization only—until their explicitly authorized personnel activates access to selected video streams. As a safeguard to avoid accidentally sending alerts, the administrators must navigate a two step process. In test mode, only avatars in a virtual reality set are displayed.

Once the emergency video access is enabled, all designated first responders can view video from certain configuration controlled major web browsers or a trusted mobile app for a limited range of time. Sharing with a first responder allows access to historical time from a preset point prior to activation time and continues active until cancelled. The entire history stream is not enabled for any emergency event.

The apparatus further includes a circuit to enable first responder to sort, filter, and prioritize which cameras they can see to efficiently manage access to possibly relevant content. In an example, all cameras in a city or geography may be desired during a dynamic situation. In that case, the responders covering a part of the zone would need to sort by geography or active motion within a time period. The simplest sort would be the superset of cameras made available by multiple active surveillance system operators. A responder may also want to add tags such as grouping street views, indoor lobbies, indoor views to better identify which cameras are potentially useful. Tags are set by either or both the responders and the system operators. Logic operations may select tags matching a criteria or pattern. Responders may add any tags. Generally system operators have a limited menu of available tags such as location, spectrum, orientation, color, sound, and range.

The apparatus provides the surveillance system operator with an option to identify specific cameras or cameras within geo-location zones for the first responders to view. All designated first responders may receive an email notification with links to particular cameras The invention further has an open RESTful cloud video DAPI to allow the organizations physical security teams to integrate the first responder video alerts and access with other emergency notification systems they may be putting in place for first responders.

The system is distinguished from conventional surveillance systems by its on-demand cloud based security and operations video management system (VMS) which has both cloud and on-premise recording for redundancy. The apparatus delivers secure, encrypted recording, camera management, mobile viewing and alerts. The platform uses time based data structures used for indexing, search, retrieval and analysis of the live and archived video.

In an embodiment, the method performed by a responder director also includes: receiving nominated 1st responders; identifying dispatch portals for notification of each 1st responder; and verifying identity and security of dispatch portal for each 1st responder.

Both 1st responders and private surveillance system administrators must regularly confirm their mutual agreement.

In an embodiment, the method performed by a responder director also includes: determining which surveillance systems are served by each verified 1st responder; determining that each surveillance system administrator potentially entrusts a verified 1st responder with a private video stream; and configuring the responder director to transmit a deep link to appropriate video streams upon activation by its surveillance system administrator.

One aspect of the invention is a system for activation of emergency responder access to video streams including: a responder pre-designation apparatus whereby system administrators pre-designate a list of first responders who upon receiving an alert will receive video during an event; a notification confirmation apparatus whereby pre-designated first responders confirm their acceptance and receive a secure mobile application with encryption and identity confirmation; an event activation apparatus whereby an authenticated system operator upon determining a situation requires an emergency response, triggers a video feed through an API to mobile devices equipped with the secure mobile application; a notification apparatus whereby an authenticated system operator selects cameras in geo-location zones or specific cameras, transforms camera identities to a deep link format, and transmits a message containing said deep link to the list of first responders; and an application programming interface integration apparatus to receive and respond to systems operated by physical security teams.

In an embodiment, the method for operation of the system also includes: receiving by application programming interface (API), event notifications, responder contact lists, camera identities, and requests to stream video images to a responder mobile device; transmitting a video image stream to a responder mobile device in response to receiving a request by an API; receiving from a user interface, a list of first responders are pre-designated to receive a stream of video images upon determination of a condition; transmitting a notification to an address of the list of pre-designated first responder; receiving acceptance from a pre-designated first responder of the intention to receive a stream of video images upon a condition and that the address is correct; enabling a downloaded application on the mobile device of the responder; receiving a determination by sensors or by an authenticated system operator of a condition; and enabling emission of a stream of video images to an enabled application on the mobile device of the responder.

One aspect of the invention is a system for activation of emergency responder video streams including: a responder pre-designation apparatus whereby system administrators pre-designate a list of first responders who upon receiving an alert will receive video during an event; a notification confirmation apparatus whereby pre-designated first responders confirm their acceptance and receive a secure mobile application with encryption and identity confirmation; an event activation apparatus whereby an authenticated system operator upon determining a situation requires an emergency response, triggers a video feed through an API to mobile devices equipped with the secure mobile application; a notification apparatus whereby an authenticated system operator selects cameras in geo-location zones or specific cameras, transforms camera identities to a transient link format, and transmits a message containing said transient link to the list of first responders; and an application programming interface integration apparatus to receive and respond to systems operated by physical security teams.

Another aspect of the invention is a method for operation of the system described above having the processes: receiving by application programming interface (API), event notifications, responder contact lists, camera identities, and requests to stream video images to a responder mobile device; transmitting a video image stream to a responder mobile device in response to receiving a request by an API; receiving from a user interface, a list of first responders are pre-designated to receive a stream of video images upon determination of a condition; transmitting a notification to an address of the list of pre-designated first responder; receiving acceptance from a pre-designated first responder of the intention to receive a stream of video images upon a condition and that the address is correct; enabling a downloaded application on the mobile device of the responder; receiving a determination by sensors or by an authenticated system operator of a condition; and enabling emission of a stream of video images to an enabled application on the mobile device of the responder.

QRcodes on garments worn by participants allow floating identity or role tags to be displayed in the images. Applicant defines for use in this application, obfuscated camera handles, or obhandles, a term to refer to aliases for camera identifiers which may be changed by the administrator at any time, manually or algorithmically to reduce risk of loss of privacy. An obhandle may be arbitrary, frequently changed, or cryptographically generated so that exposure over public communication channels does not reveal a permanent camera identifier.

Referring now to FIG. 1, a conventional surveillance system includes a facility asset administrator console 310 (administrator) in control of a plurality of surveillance cameras 312. The cameras stream video to a video stream store 400 or cache co-located at a secure and redundant surveillance service center 500 which is remote from the facility and its cameras.

Figure 2:
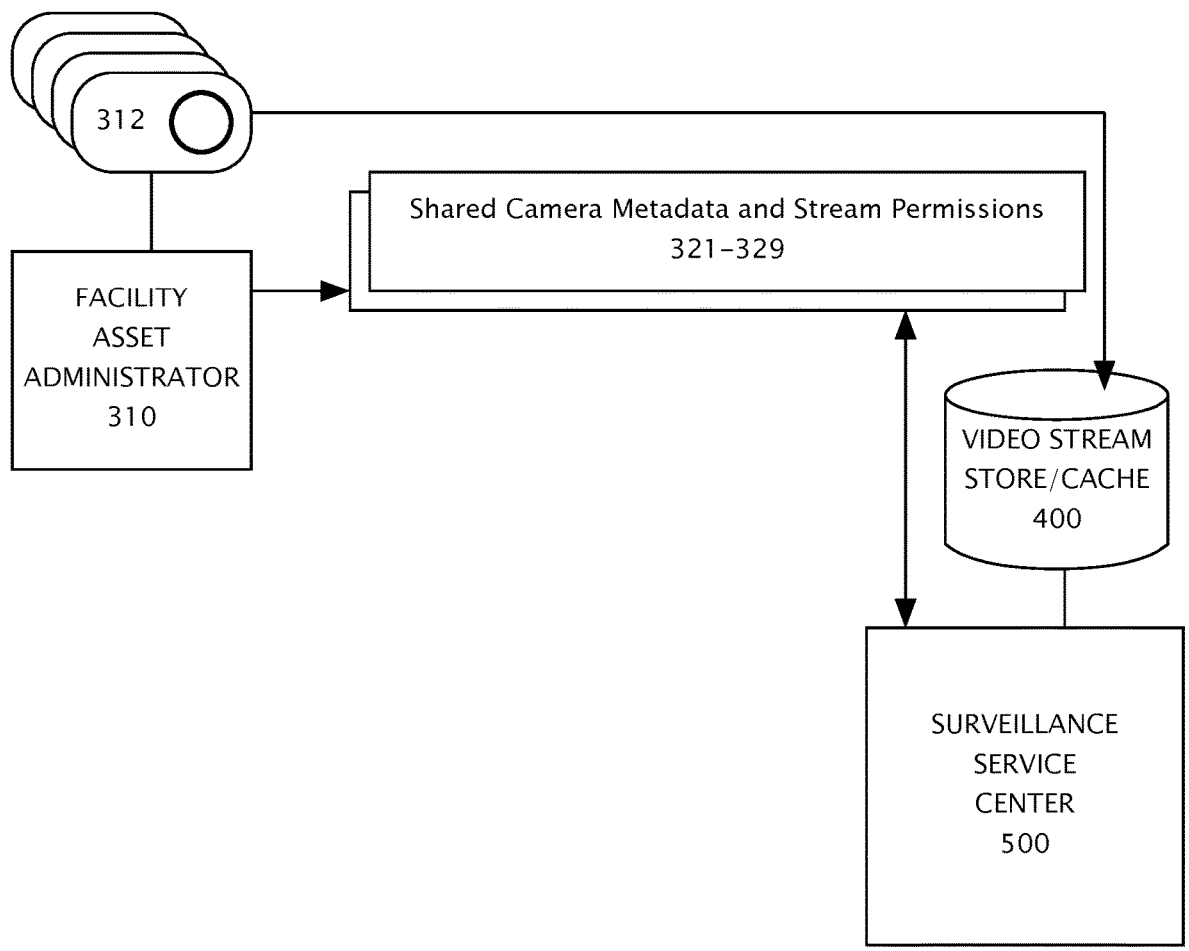

The invention illustrated in FIG. 2 includes a shared camera meta data and stream permissions store 321-329 which is under the control of the administrator. The administrator sets permissions on whether the camera is shared with at least one responding agency. The administrator controls how much of the camera meta data is visible to responding agencies such as its physical location, its resolution, color/monochrome, resolution, visible/non-visible ranges of spectrum, live streaming, and range of history availability e.g. past epoch/current epoch. The administrator can store several sets of permissions and switch among them or control each permission separately. Some cameras may not be shared at all and are not in this store.

Figure 3:
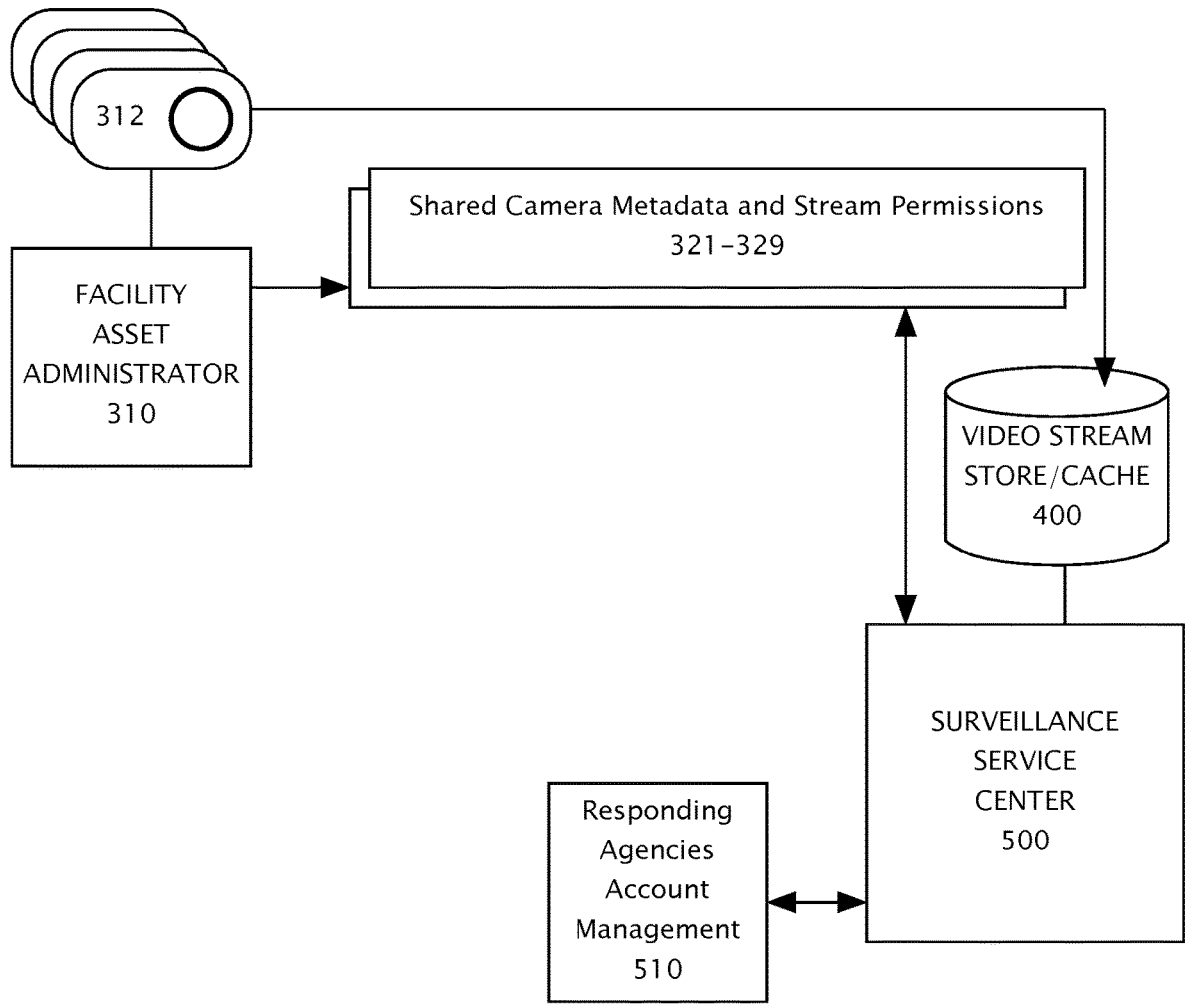

In FIG. 3 is shown that the invention also includes a responding agency account management system 510 which includes the accounts and passwords for an agent to login at the surveillance service center 500.

Figure 4:
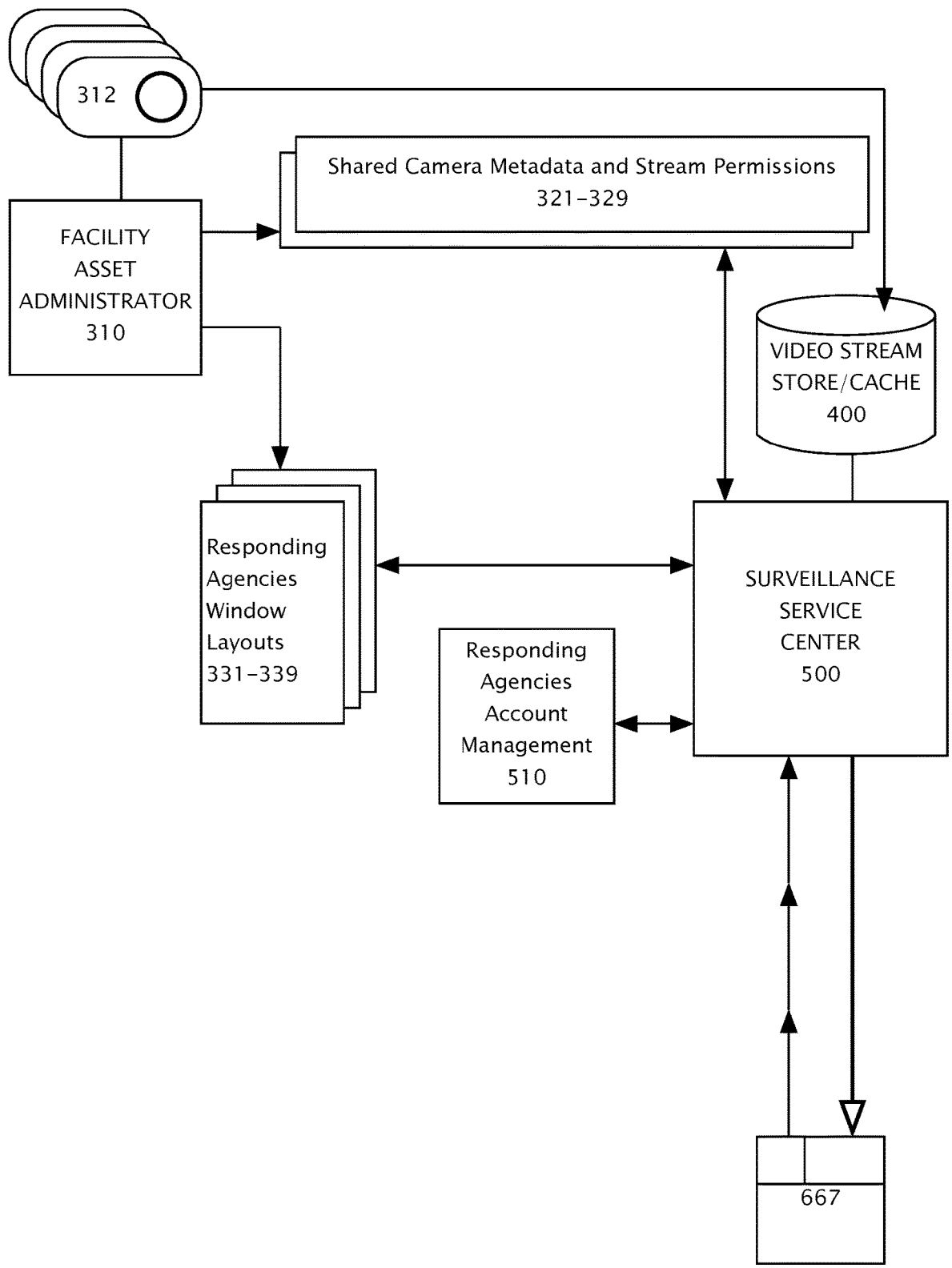

FIG. 4 discloses that there are a plurality of responding agency window layouts 331-339 under the control of the administrator 310. The layouts identify the cameras for each window pane, but the permissions store determines what is transmitted to the window pane. Statistics, meta data, or a still test image may be used as a default during setup and test of a display 667.

Figure 5:
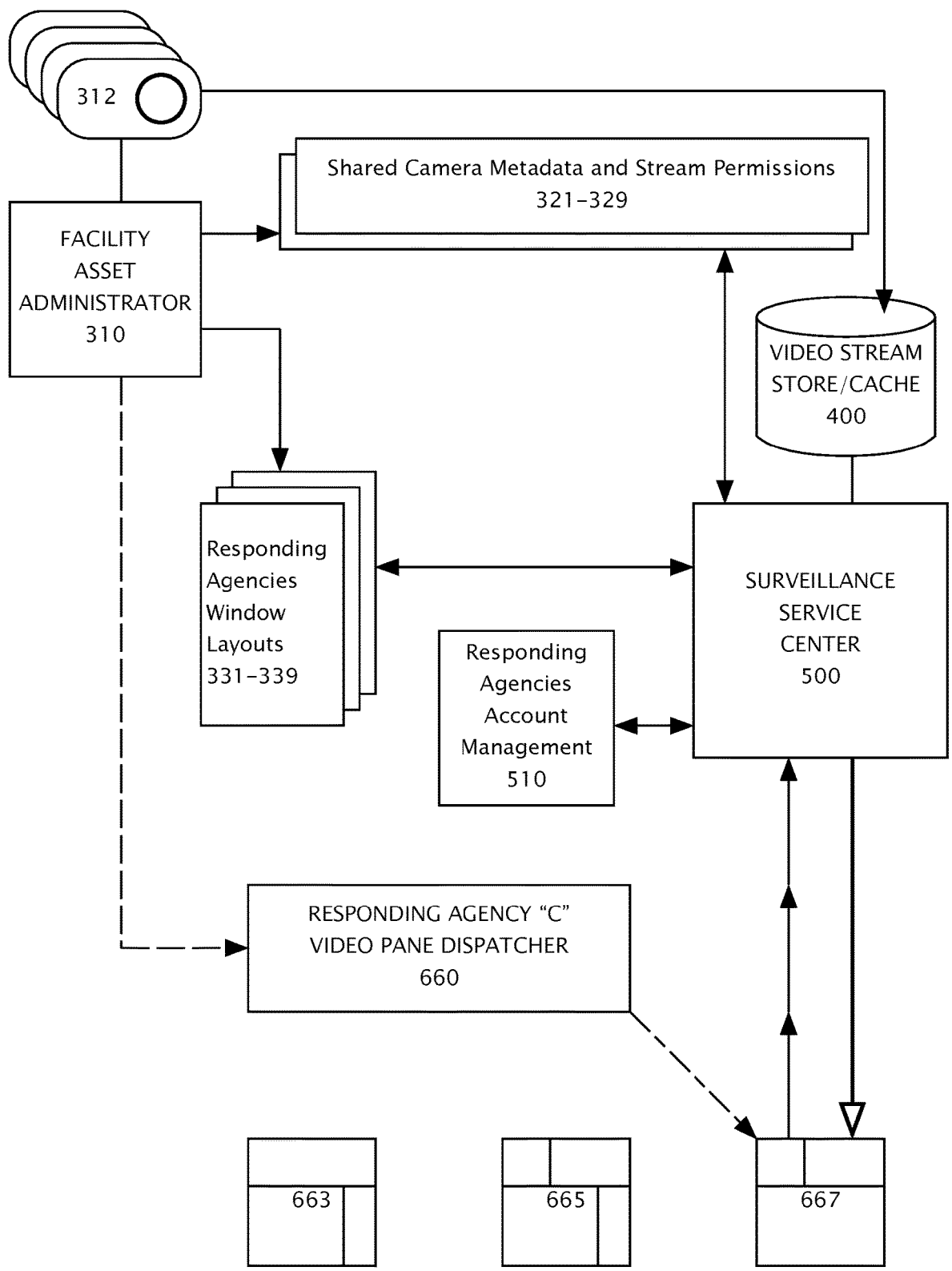

FIG. 5 includes an electronic message system to inform a responding agency dispatcher 660 that permissions have been set for access and that the administrator requests that the agency use the permitted video streams. Dispatcher selects among mobile displays 663 665 667 to assign as first responder.

The responder 667 first logs into the service center, receives a window layout identifying cameras, and requests display of surveillance content. The service center checks user name and password, retrieves and provides the current window layout, and streams whatever the administrator has enabled to access the shared camera meta data and video streams according to the permissions in stores 321-329

Live streaming or history is enabled by the administrator through changing a parameter within permissions store. A facility asset administrator may select a window layout designed for different types of emergencies or sections of a campus or have different windows for different agencies.

Figure 6:
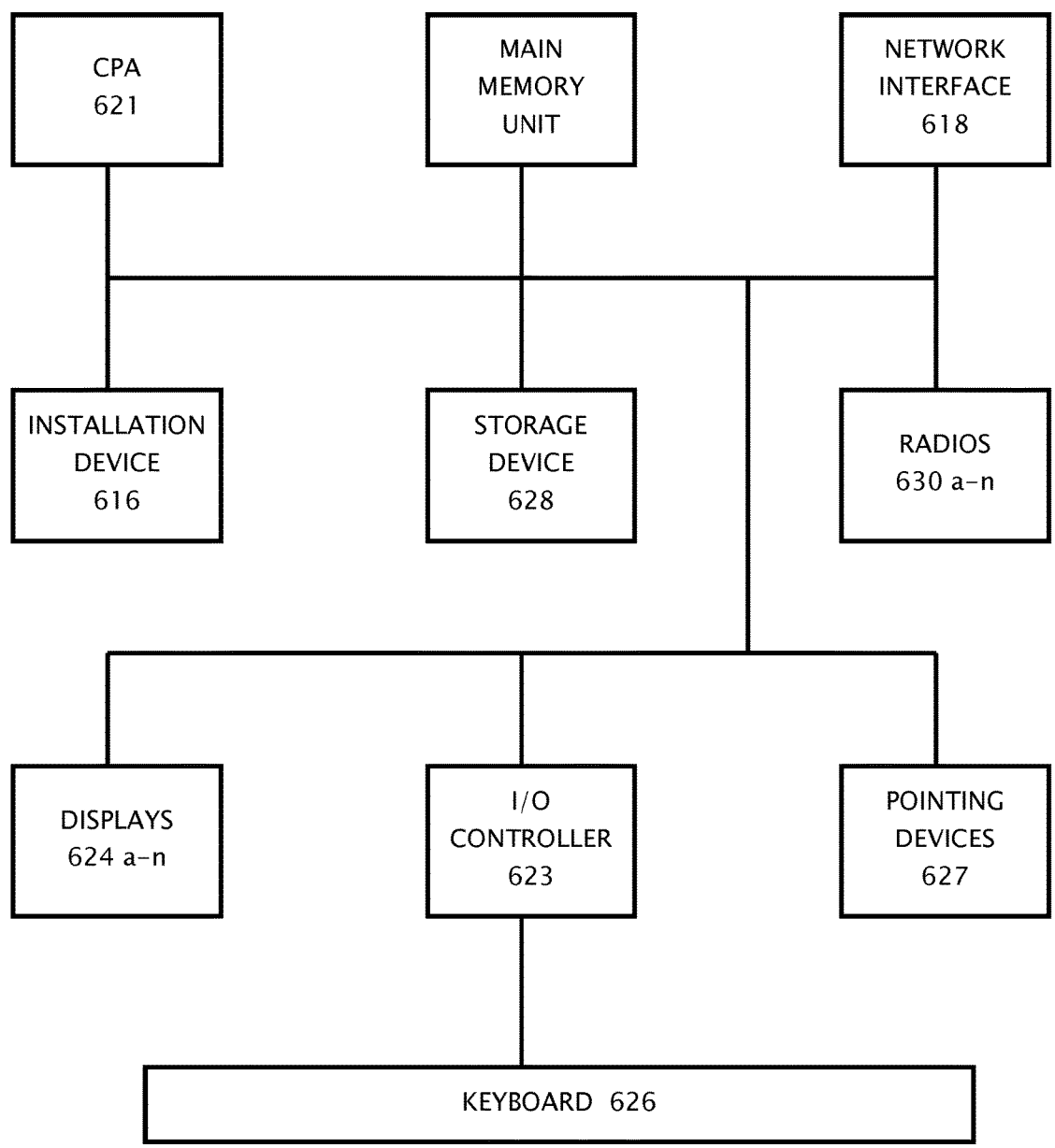
FIG. 6 is a block diagram of a processor suitable for performing a method embodiment of the invention.

FIG. 6 is a block diagram of a processor having one or more cores within CPU 621. As is known, systems disclosed above may be embodied by programmable logic, field programmable gate arrays, mask programmable gate arrays, standard cells, and computing devices limited by methods stored as instructions in non-transitory media.

Generally a computing devices 600 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A computing device may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on a computing device.

FIG. 6 depicts block diagrams of a processor or computing device 600 useful for practicing an embodiment of the invention. As shown in FIG. 6, each computing device 600 includes a central processing unit 621, and a main memory unit 622. A computing device 600 may include a storage device 628, an installation device 616, a network interface 618, an I/O controller 623, display devices 624a-n, a keyboard 626, a pointing device 627, such as a mouse or touchscreen, and one or more other I/O devices 630a-n such as baseband processors, Bluetooth, GPS, and Wi-Fi radios. The storage device 628 may include, without limitation, an operating system and software.

The central processing unit 621 is any logic circuitry that responds to and processes instructions fetched from the main memory unit 622. In many embodiments, the central processing unit 621 is provided by a microprocessor unit, with one or more cores, such as: those manufactured under license from ARM. The computing device 600 may be based on any of these processors, or any other processor.

Main memory unit 622 may be one or more memory chips capable of storing data and allowing any storage location to be directly accessed by the microprocessor 621. The main memory 622 may be based on any available memory chips. Furthermore, the computing device 600 may include a network interface 618 to interface to a network through a variety of connections. In one embodiment, the computing device 600 communicates with other computing devices 600 via any type and/or form of gateway or tunneling protocol such as Secure Socket Layer (SSL) or Transport Layer Security (TLS). The network interface 118 may comprise a built-in network adapter, network interface card, wireless network adapter, USB network adapter, modem or any other device suitable for interfacing the computing device 600 to any type of network capable of communication and performing the operations described herein.

A computing device 600 of the sort depicted in FIG. 6 typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

In some embodiments, the computing device 600 may have different processors, operating systems, and input devices consistent with the device. In other embodiments the computing device 600 is a mobile device.

In some embodiments, the computing device 600 comprises a combination of devices. In another of these embodiments, the computing device 600 is device in the iPhone smartphone line of devices, manufactured by Apple Inc., of Cupertino, Calif. In still another of these embodiments, the computing device 600 is a device executing the Android open source mobile phone platform distributed by the Open Handset Alliance; for example, the device 600 may be a device such as those provided by Samsung Electronics of Seoul, Korea, or HTC Headquarters of Taiwan, R.O.C. In other embodiments, the computing device 600 is a tablet device such as, for example and without limitation, the iPad line of devices, manufactured by Apple Inc.; the Galaxy line of devices, manufactured by Samsung; and the Kindle manufactured by Amazon, Inc. of Seattle, Wash.

Figure 7:
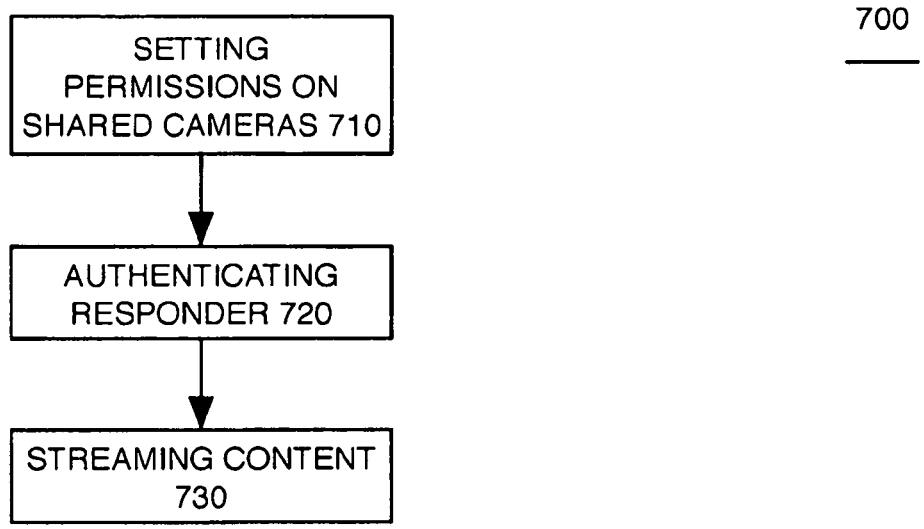
FIG. 7 is a flowchart of an illustrative method embodiment of the invention causing a processor to perform aspects of the invention at a video streaming server.

Referring to FIG. 7 a method is disclosed 700, comprising the steps performed by circuits controlling a video streaming server 500: determining handles for shared cameras, streaming permissions, and meta data in a permission control circuit 321 responsive to a facility administrator console 310 and storing a responding agency window layout 331 responsive to a facility administrator console 310 containing handles for video camera streams 710; verifying authentication credentials 720 received from a responding agency mobile device 667; and upon receiving access requests from a display device streaming video content 730; wherein video content is one of historical video images, live video images, and static meta data from a shared camera.

Figure 8:
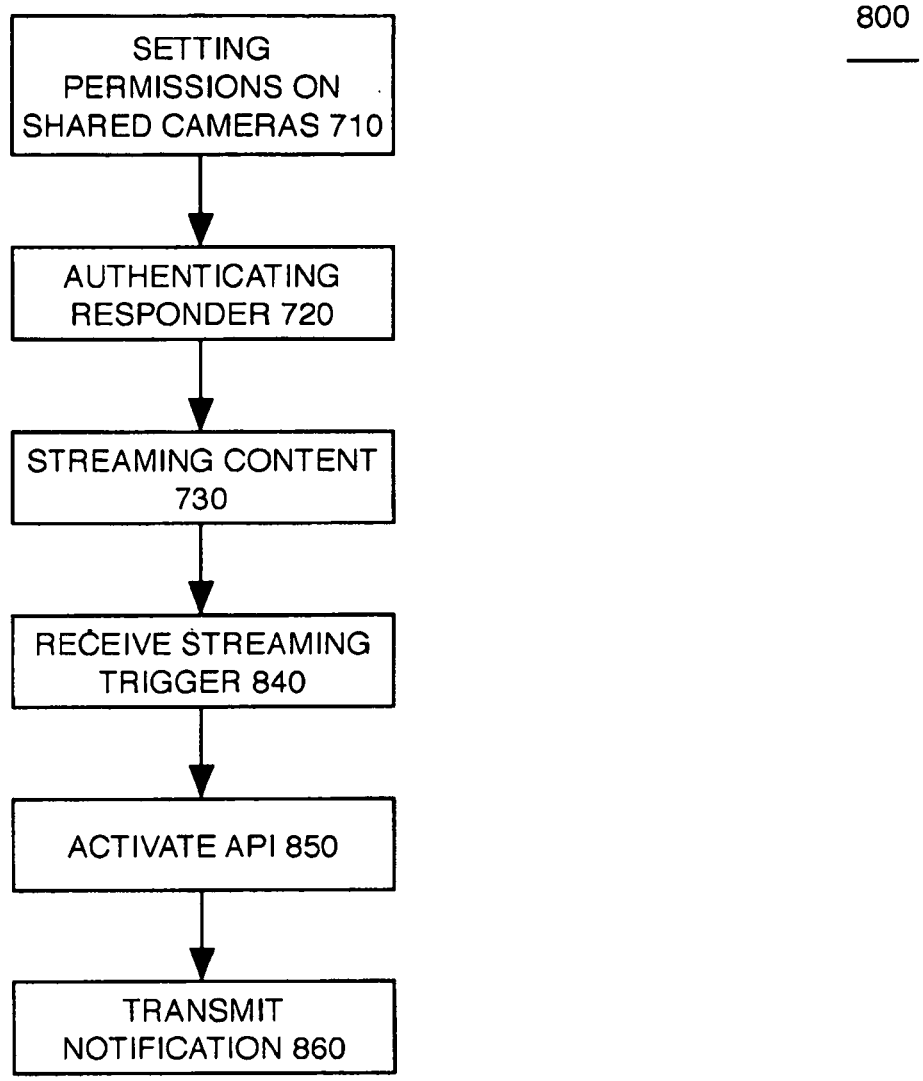
FIG. 8 is a flowchart of an illustrative method embodiment of the invention causing a processor to perform aspects of the invention at a surveillance service center server.

FIG. 8 illustrates a method at a server, the method comprising: receiving from a first user a trigger to notify a pre-arranged 1st emergency agency (responder) of camera stream availability 840; activating an application programming interface (API) to access selected cameras by watcher devices operable by the responder 850; and transmitting to the responder a notification of API activation 860.

Figure 9:
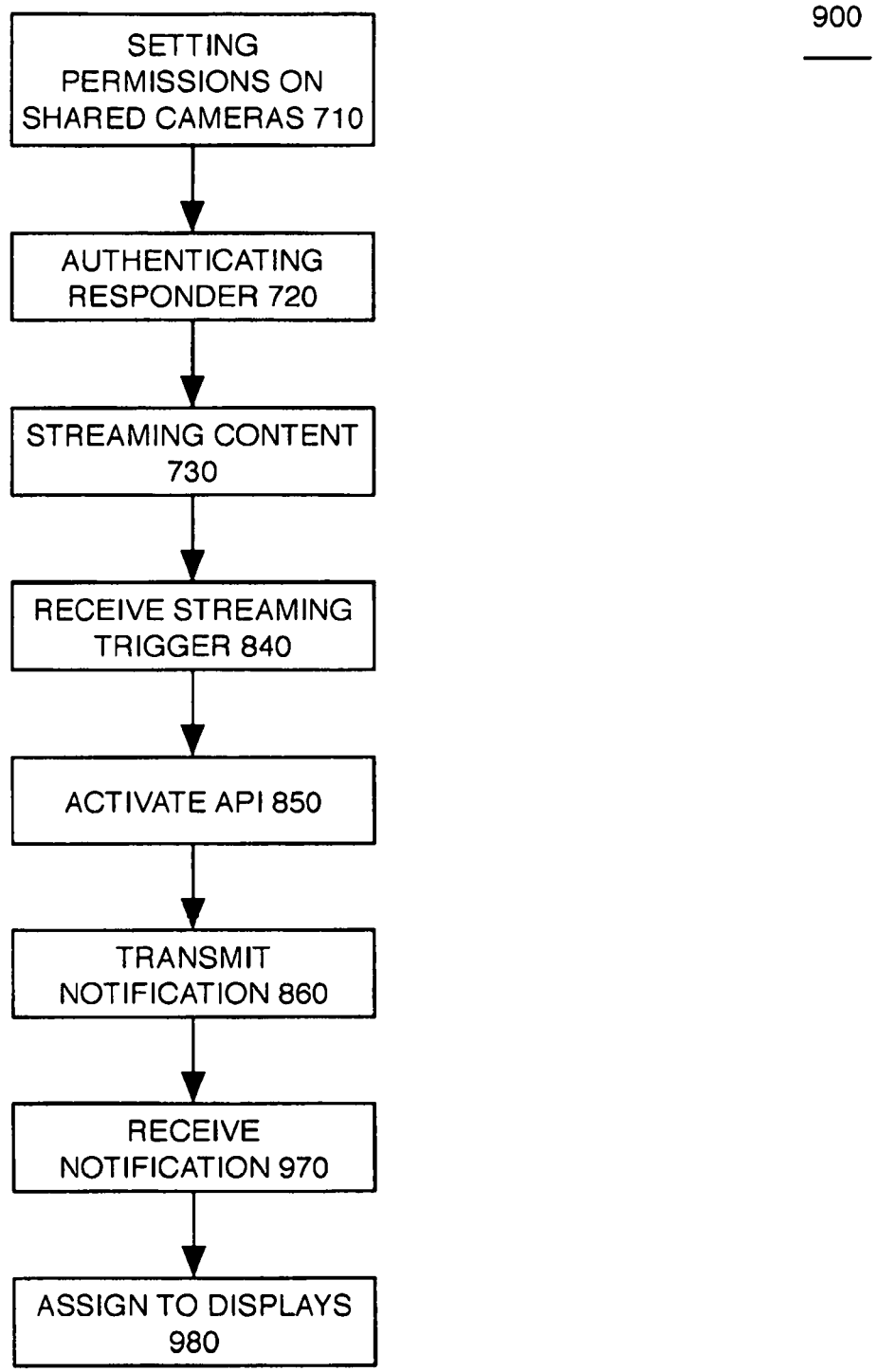
FIG. 9 is a flowchart of an illustrative method embodiment of the invention causing a processor to perform aspects of the invention at an emergency agency apparatus.

FIG. 9 illustrates a method at an emergency agency comprising: receiving a notification of camera stream availability from a server 970; and assigning streams of camera images to responder mobile displays 980.

Figure 10:
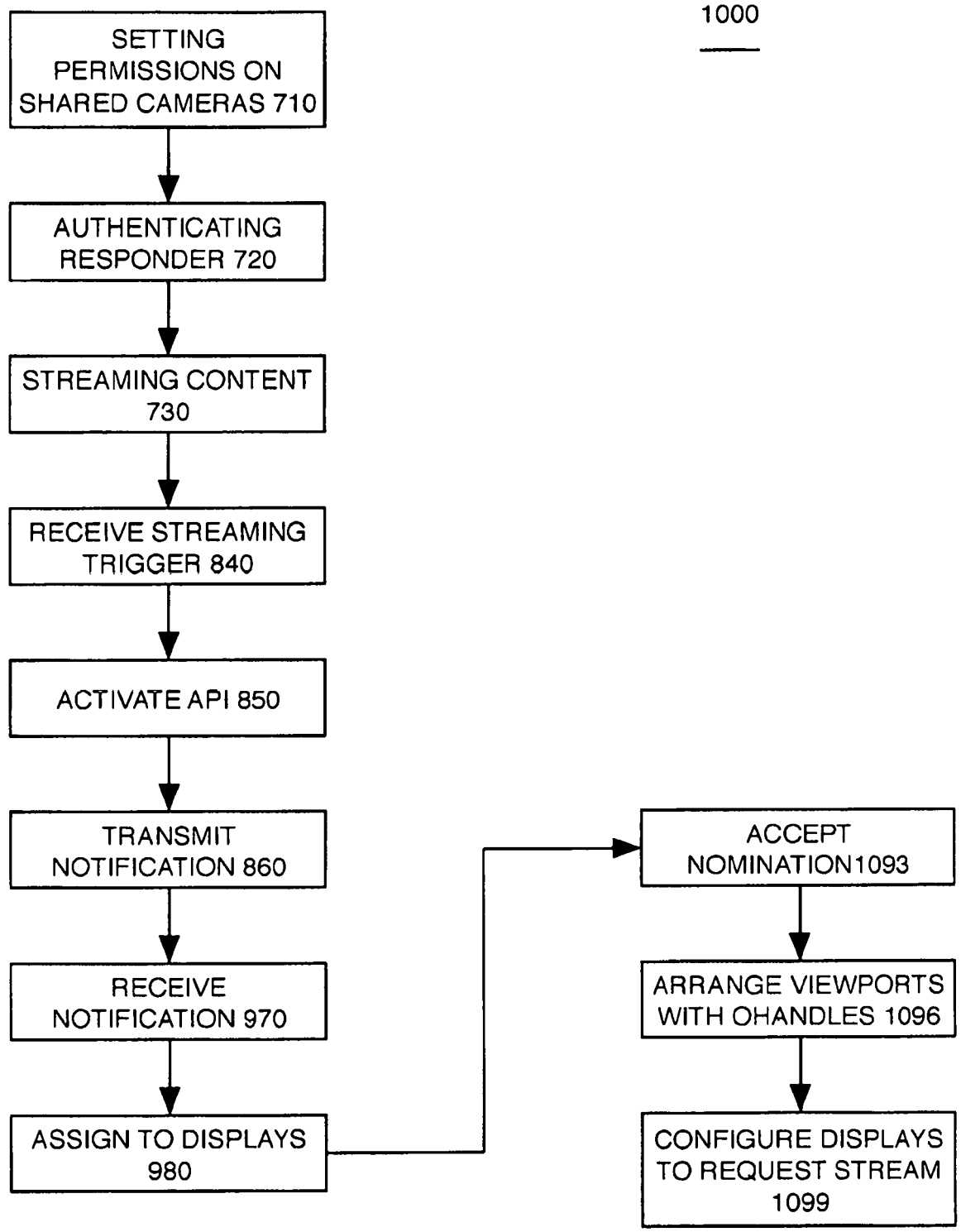
FIG. 10 is a flowchart of an illustrative method embodiment of the invention causing a processor to perform aspects of the invention at a responding agency apparatus.

FIG. 10 illustrates a method at a responding agency: accepting a nomination from at least one surveillance system user to access a plurality of camera streams 1093; arranging a plurality camera streams into a pre-arranged viewport by obfuscated handles 1096; and configuring a display to request a camera stream in a viewport 1099.

Figure 11:
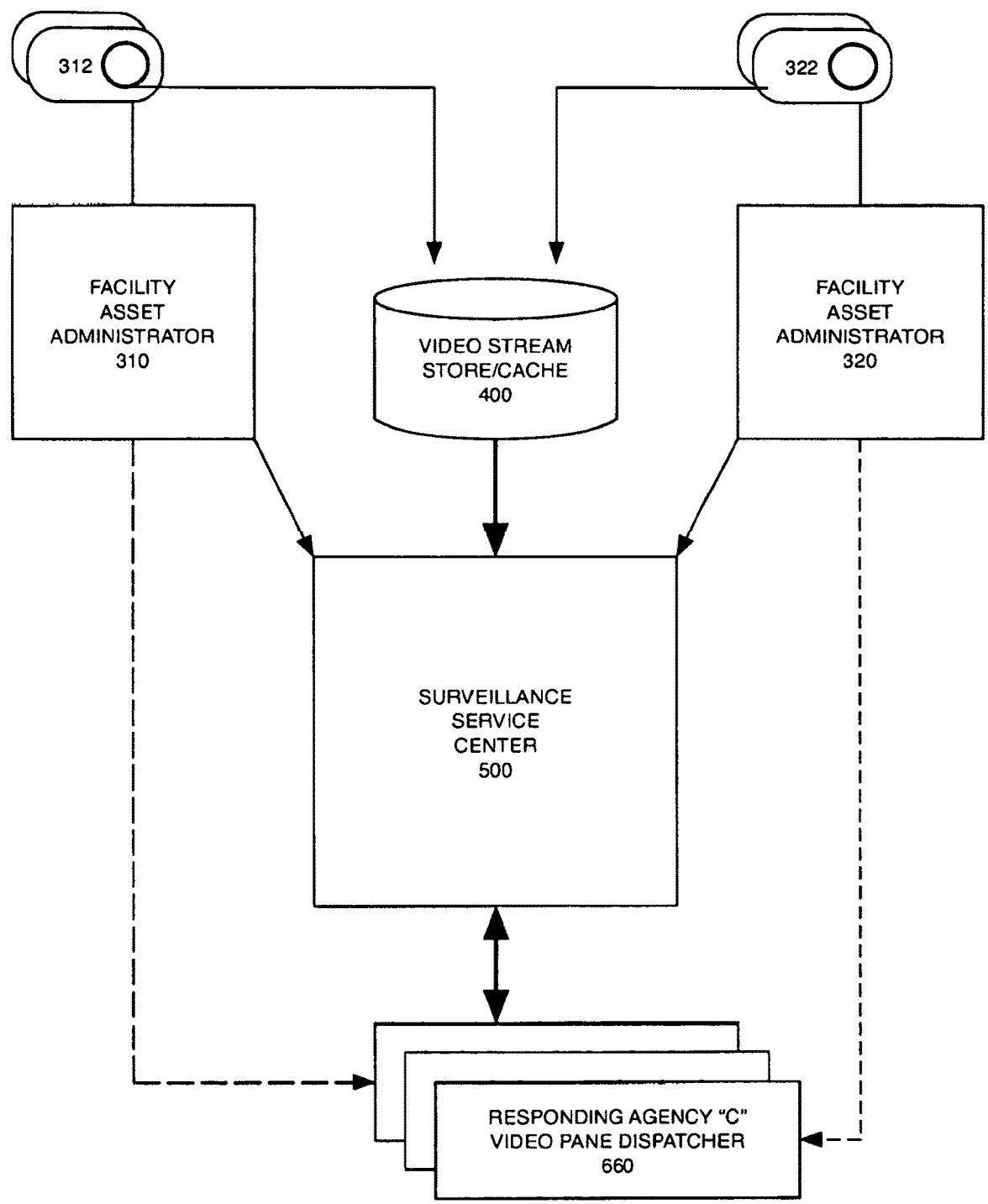
FIG. 11 is a block diagram of a system embodiment for a plurality of independent facility asset administrators or customers of a video surveillance service.

FIG. 11 is a block diagram of a plurality of customers of a video surveillance service enabling a one or more responding agencies to view shared camera streams. A plurality of Facility Asset Administrators (FAA) 310 320 control video surveillance cameras 312 322 which capture and transmit video streams to the store/cache 400 associated with a surveillance service center 500. Each FAA controls streaming from the surveillance service center 500 to at least one Responding Agency 660. It could be two different agencies or if they are neighbors, the same Responding Agency. Separately, each FAA notifies a video pane dispatcher of video stream availability.

Figure 12:
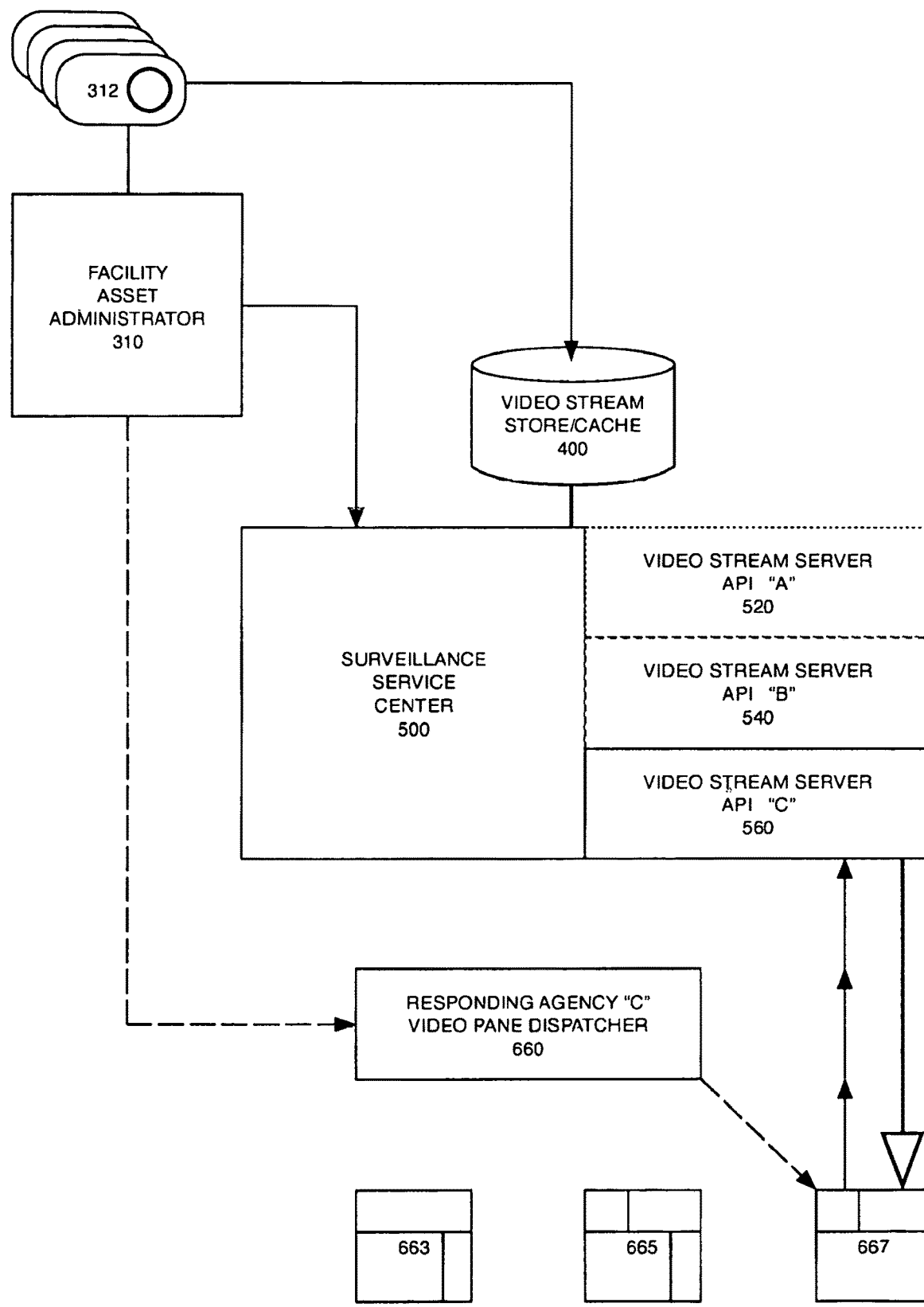
FIG. 12 is a block diagram of a system embodiment for one of a plurality of responding agencies, each receiving a different video stream.

FIG. 12 is a block diagram of details of one video stream path. The surveillance service center 500 has a plurality of processor cores 520 540 560 each of which could support a dedicated video stream server. In FIG. 12, FAA 310 has popped a virtual machine and API useful only to Agency "C" into processor core 560. FAA 310 has also notified the Responding Agency "C" video pane dispatcher 660 of shared cameras that may be streamed through the server dedicated to Agency "C".

The dispatcher forwards the shared camera identifiers to at least one mobile video display 667. The app on the display transmits authentication credentials and requests meta data or live video or video history for each of the window panes in its window layout.

The server responds and streams the requested video. If a different FAA in the same city transmits a notification message, the video stream server 560 will provide the mobile video display with streams from its shared cameras.

Figure 13:
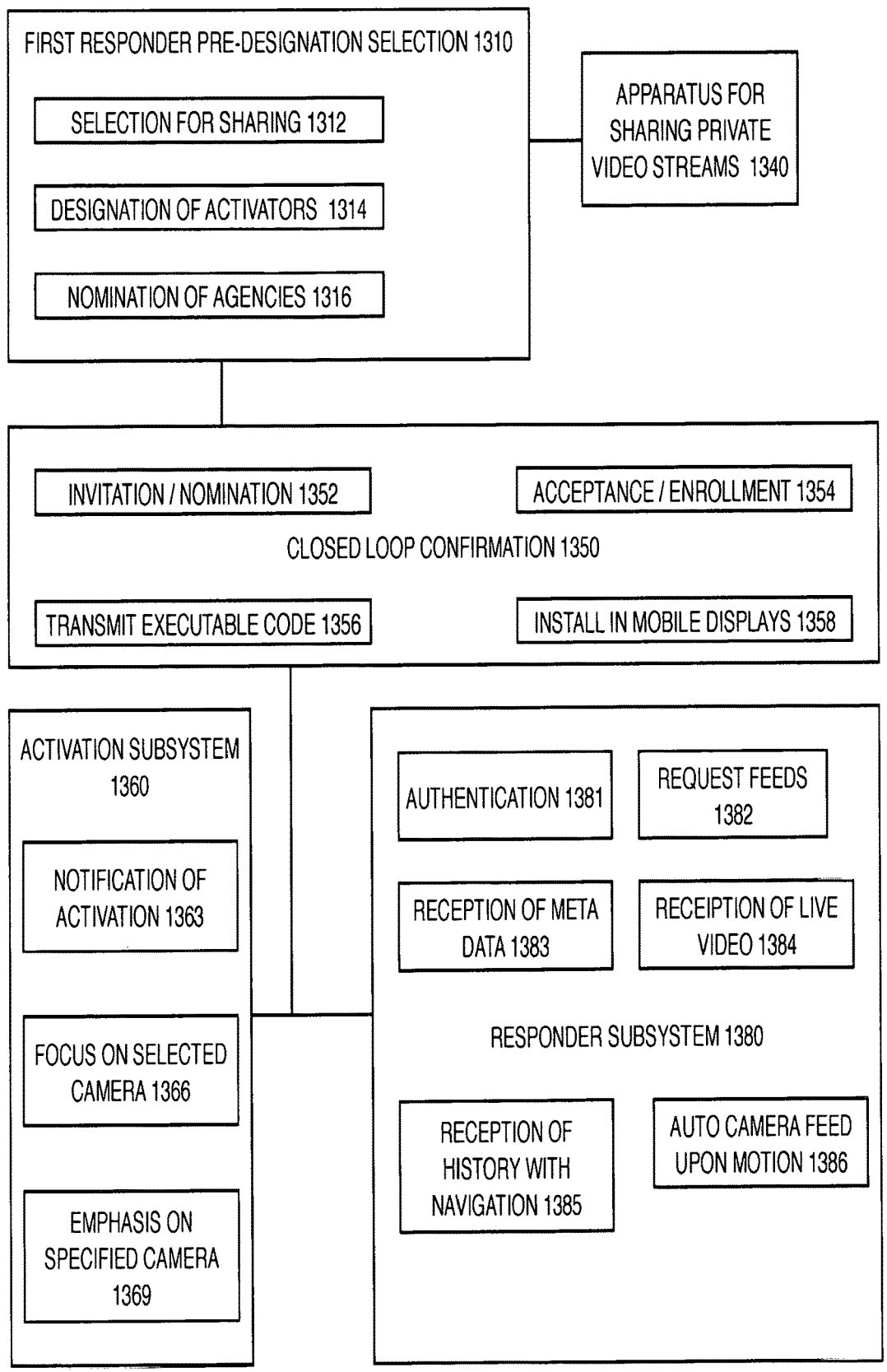
FIG. 13 is a block diagram of a system for sharing private video streams with first responders.

Referring now to FIG. 13, a system for sharing private video streams with first responders includes:

a first responder pre-designation selection subsystem means 1310 for selection of cameras, epochs, and meta data for sharing 1312, designation by facility administrator of deputies (Activators) authorized to activate first responder video feed 1314, and designation of which first responder agencies are nominated to receive shared camera feed 1316;

an apparatus 1340 for sharing private video streams;

a closed loop confirmation subsystem means 1350 for invitation/nomination to enroll 1352, acceptance and enrollment 1354, transmission of executable mobile viewer application code 1356, and installation in wireless mobile displays 1358;

an activation subsystem means 1360 for notification of activation 1363, focus on a specific camera selected by Activator 1366, and communication of emphasis on specified camera 1369; and a responder subsystem means 1380 for presentation and authentication such as by password and user identity at a login form 1381, submission of a request for authorized camera feeds 1382, reception of meta data for display or configuration 1383, reception of a live video feed from a shared camera 1384, reception of a video history with navigation control 1385, and automatic camera feed selection upon motion detection 1386. As is known, means can be at least one of the group digital circuits, programmable digital circuits configured by non-transitory media coding, a processor causing performance of a method embodiment by executing instructions encoded into non-transitory media, and custom semiconductor electronics.

Figure 14:
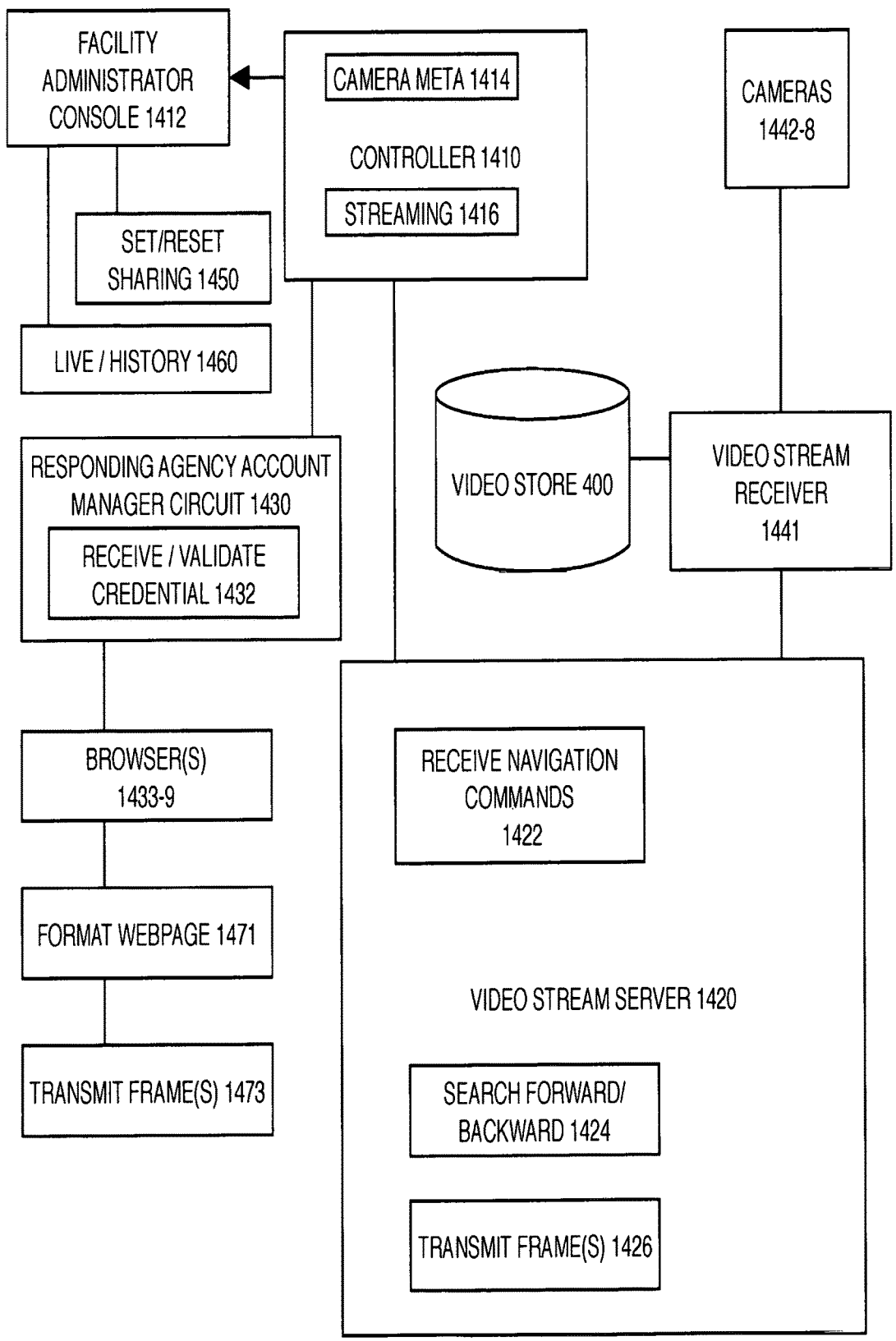
FIG. 14 is a block diagram of an apparatus for sharing private video streams to a browser of a responding agency.

Referring now to FIG. 14, an apparatus 1400 for sharing private video streams includes: a permissions controller for a plurality of cameras (controller 1410); the controller remotely coupled to a facility administrator console 1412, a video stream server (video server 1420); the controller further coupled to the video stream server, and a responding agency account manager circuit (manager 1430), the manager remotely coupled to at least one browser 1433-9, and coupled to the video stream server, mutually interconnected by communication media. In an embodiment, the apparatus also includes and connects with
a video stream receiver (receiver 1441); the receiver remotely coupled to a plurality of cameras 1442-8.
In an embodiment, the apparatus also includes and connects with a video stream store (video store 400); the video store coupled to the receiver 1441.
In an embodiment, the manager 1430 includes a circuit to receive and validate a credential such as a id password, for a responding agency 1432.
In an embodiment, the apparatus also includes and connects with a circuit to receive commands from a facility administrator to set and reset a camera for sharing 1450.
In an embodiment, the apparatus also includes and connects with a circuit to receive commands from a facility administrator to set permission for at least one of live streaming and history streaming 1460.
In an embodiment, the apparatus also includes and connects with a circuit to format a webpage having window frames populated with identifiers of shared cameras 1471; and a circuit to receive at least one request from a remote browser to transmit at least one video image of a shared camera 1473.
In an embodiment, the permissions controller 1410 has media for stored values of meta data of the camera 1414; and stored values streaming permission for live and for history 1416.
In an embodiment, the video stream server 1420 also includes: a circuit to receive navigation commands from the browser 1422; a circuit to search forward or backward in time of recordation of the video stream 1424; and a circuit to transmit at least one video frame according to navigation commands 1426.

Figure 15:
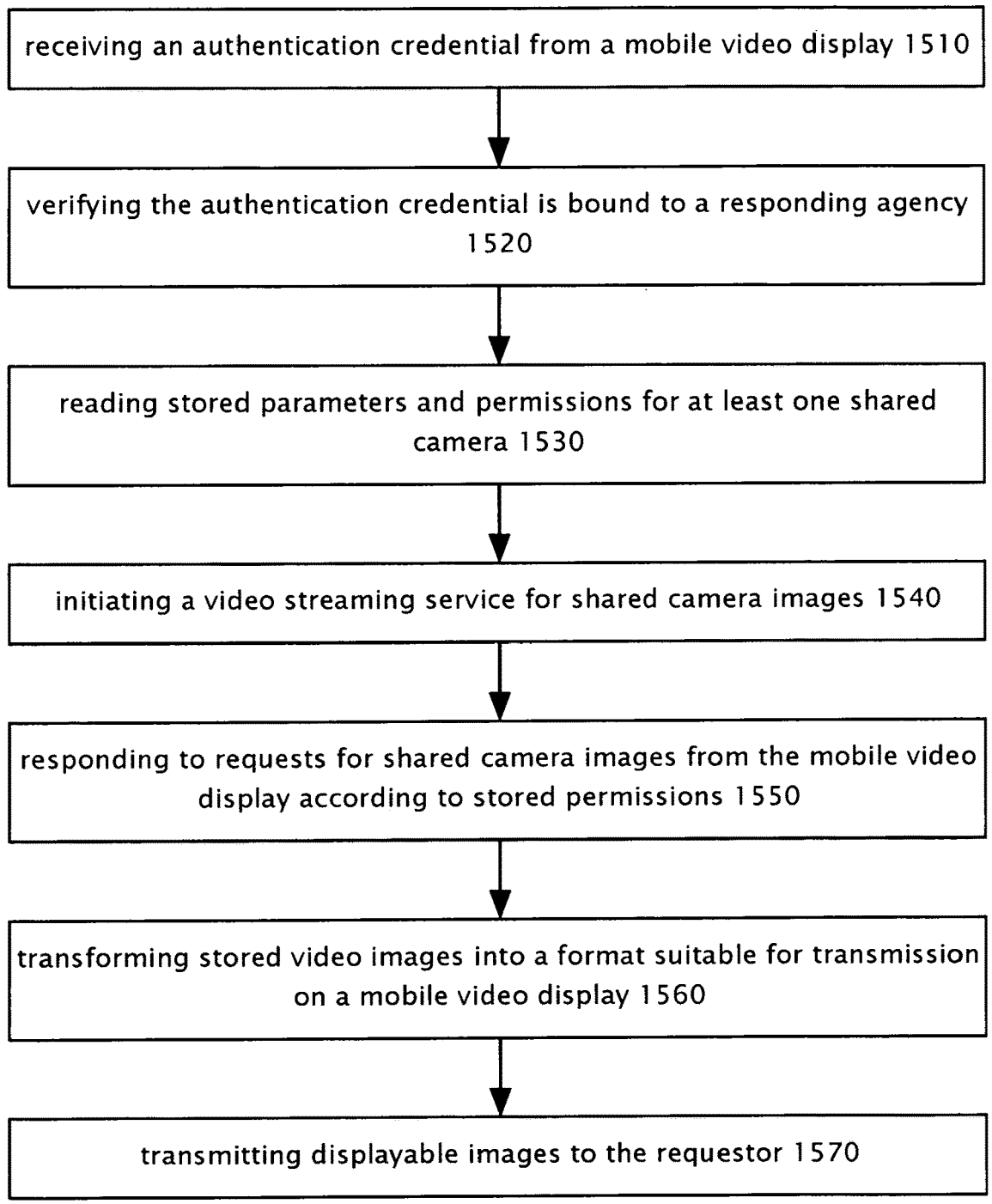
FIG. 15 is a flowchart of a method embodiment for operation of a surveillance system video server.

Referring now to FIG. 15, a method for operation of a surveillance system video server 1500 includes:
receiving an authentication credential from a mobile video display 1510;
verifying the authentication credential is bound to a responding agency 1520;
reading stored parameters and permissions for at least one shared camera 1530;
initiating a video streaming service for shared camera images 1540; and,
responding to requests for shared camera images from the mobile video
display according to stored permissions 1550.
In an embodiment, the method also includes:
transforming stored video images into a format suitable for transmission on a mobile video display 1560; and
transmitting displayable images to the requestor 1570.

Figure 16:
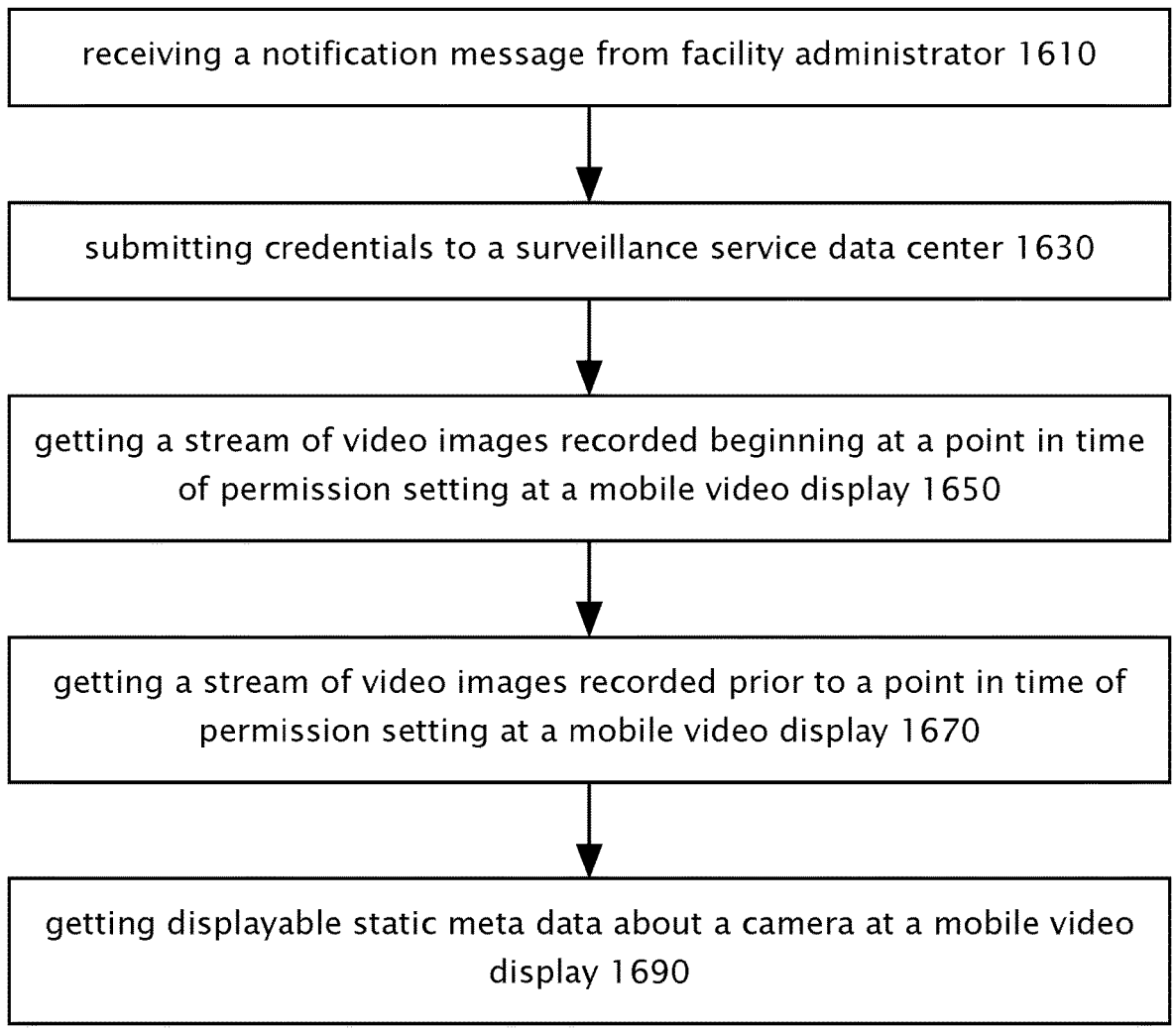
FIG. 16 is a flowchart of a method embodiment for operation of a mobile video display.

Referring now to FIG. 16, the method for operation of a mobile video display 1600 includes:
receiving a notification message from facility administrator 1610; and
submitting credentials to a surveillance service data center 1630, wherein credentials are a password and user identity.
In an embodiment, the method also includes:
getting a stream of video images recorded beginning at a point in time of permission setting at a mobile video display 1650.

In an embodiment, the method also includes:
getting a stream of video images recorded prior to a point in time of permission
setting at a mobile video display 1670.
In an embodiment, the method also includes:
getting displayable static meta data about a camera at a mobile video display 1690.

Figure 17:
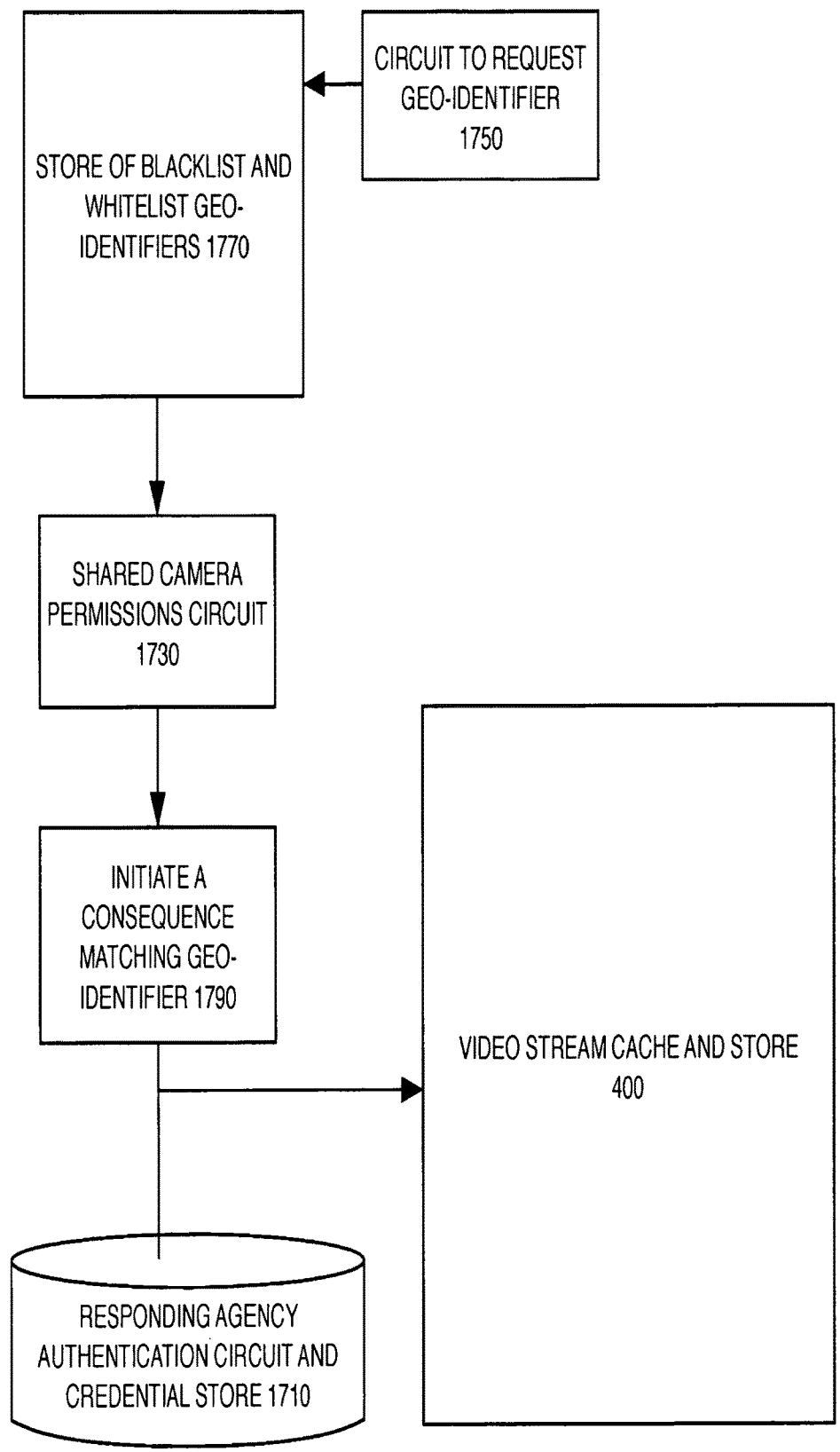
FIG. 17 is a block diagram of a further embodiment of an apparatus for sharing private video streams to a browser of a responding agency.

Referring now to FIG. 17, the apparatus for sharing private video streams further includes: a video stream cache and store 400; a responding agency authentication circuit and credential store 1710; a shared camera permissions circuit 1730 to enable streaming metadata and images over a range of time for each shared camera; a circuit to request a geo-identifier 1750 from an authenticated responding agency video display; a store of blacklist and whitelist geo-identifiers (geo-store) 1770; and a circuit to initiate a consequence 1790 after comparing the geo-store with a geo-identifier received from a mobile wireless video display.

Figure 18:
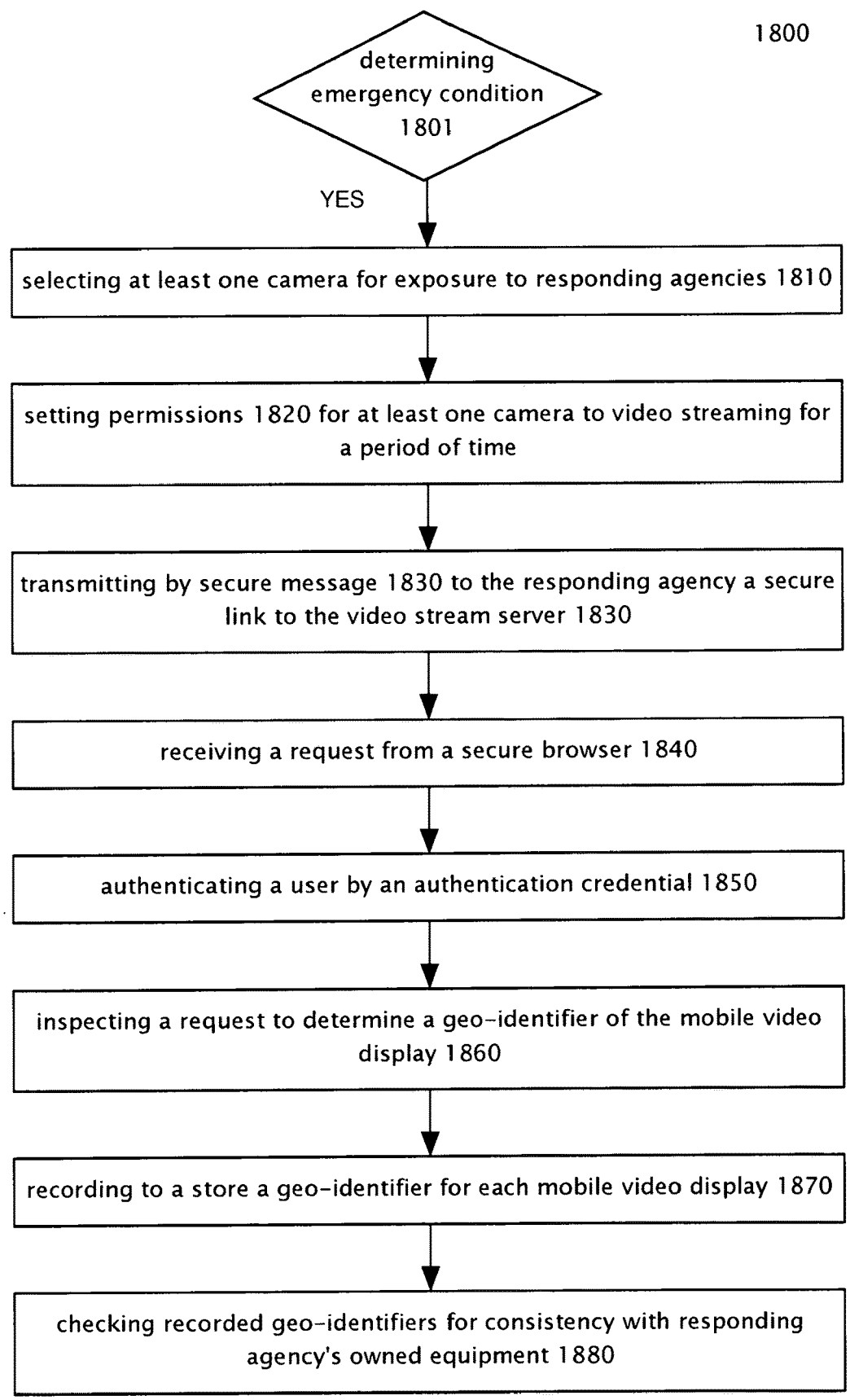
FIG. 18 is flowchart of a further method embodiment for operation of a surveillance system video server.

Referring now to FIG. 18, in an embodiment, a method for operation of a surveillance system video server further includes: upon determining an emergency condition 1801, selecting at least one camera for exposure to responding agencies 1810;
setting permissions 1820 for at least one camera to video streaming for a period of time beginning before, ending after, or including the current time of setting;
transmitting by secure message 1830 to the responding agency a secure link to the video stream server; whereby the responding agency is notified to request streaming from the selected camera(s), receiving a request from a secure browser 1840;
authenticating a user by an authentication credential 1850, in an embodiment an authentication credential is a password;
inspecting a request to determine a geo-identifier of the mobile video display 1860;
recording to a store a geo-identifier for each mobile video display 1870; and
checking recorded geo-identifiers for consistency with responding agency's owned equipment 1880. Non-limiting exemplary geo-identifiers include but are not limited to one of a GPS coordinate, a LCID, an IPv6 address, a Wi-Fi access point, a Bluetooth beacon, a messaging host server, an IMEI number and their equivalents.

Figure 19:
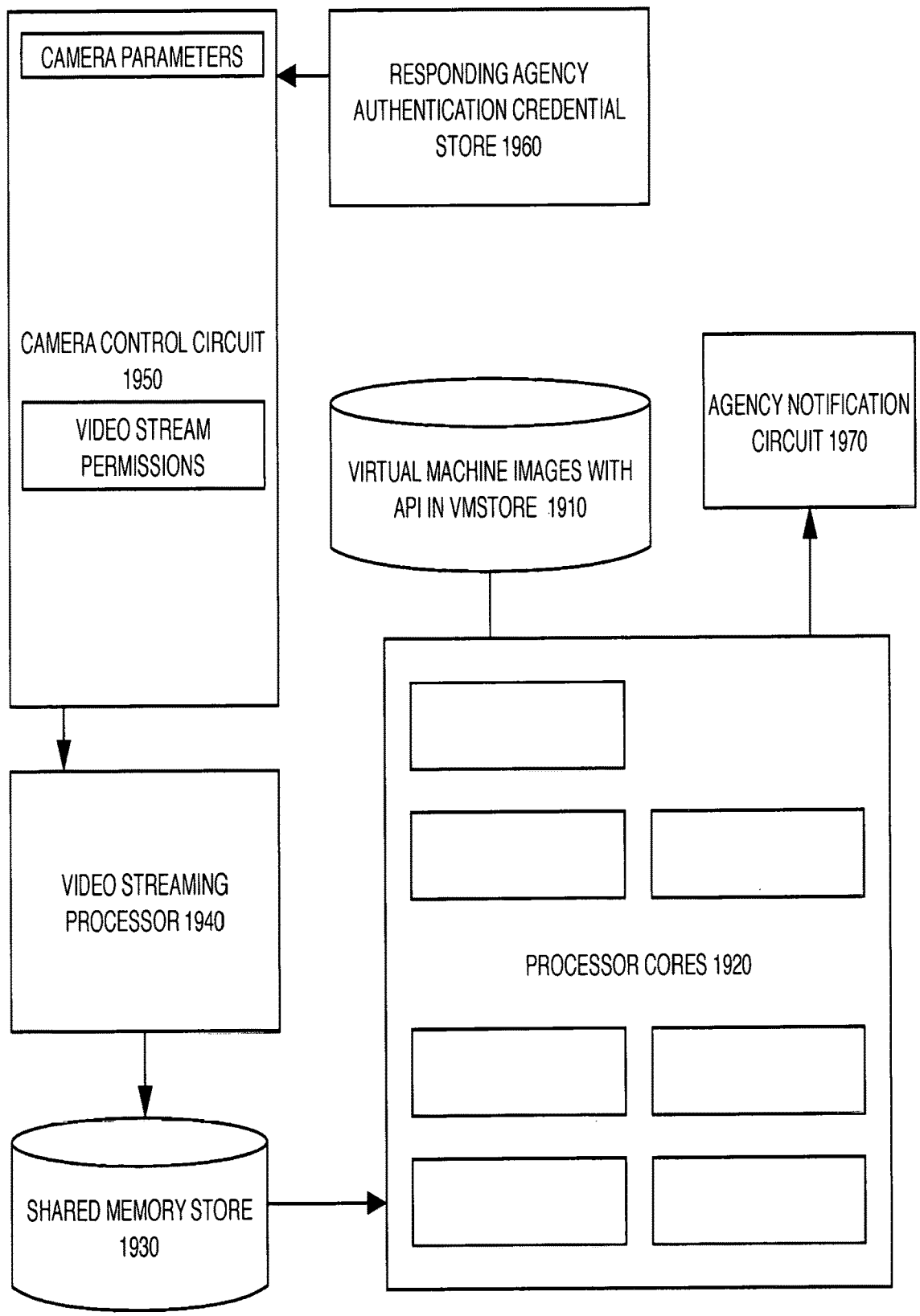
FIG. 19 is a block diagram of a further embodiment of an apparatus for sharing private video streams.

Referring to FIG. 19, the apparatus for sharing private video streams further includes: a plurality of virtual machine images with dedicated application programming interface instructions encoded in a computer-readable non-transitory store (vmstore) 1910; a plurality of processor cores (cores) coupled to said vmstore 1920; a shared memory store 1930; a video streaming processor 1940 coupled by interprocess communication (IPC) to said cores through the shared memory store; a camera control circuit 1950 to record parameters for each camera and permissions for video streams requested by obfuscated camera handles (obhandles); a responding agency authentication credential store 1960; and, an agency notification circuit 1970 to generate and transmit virtual links to virtual machines and window layouts with obhandles.

Figure 20:
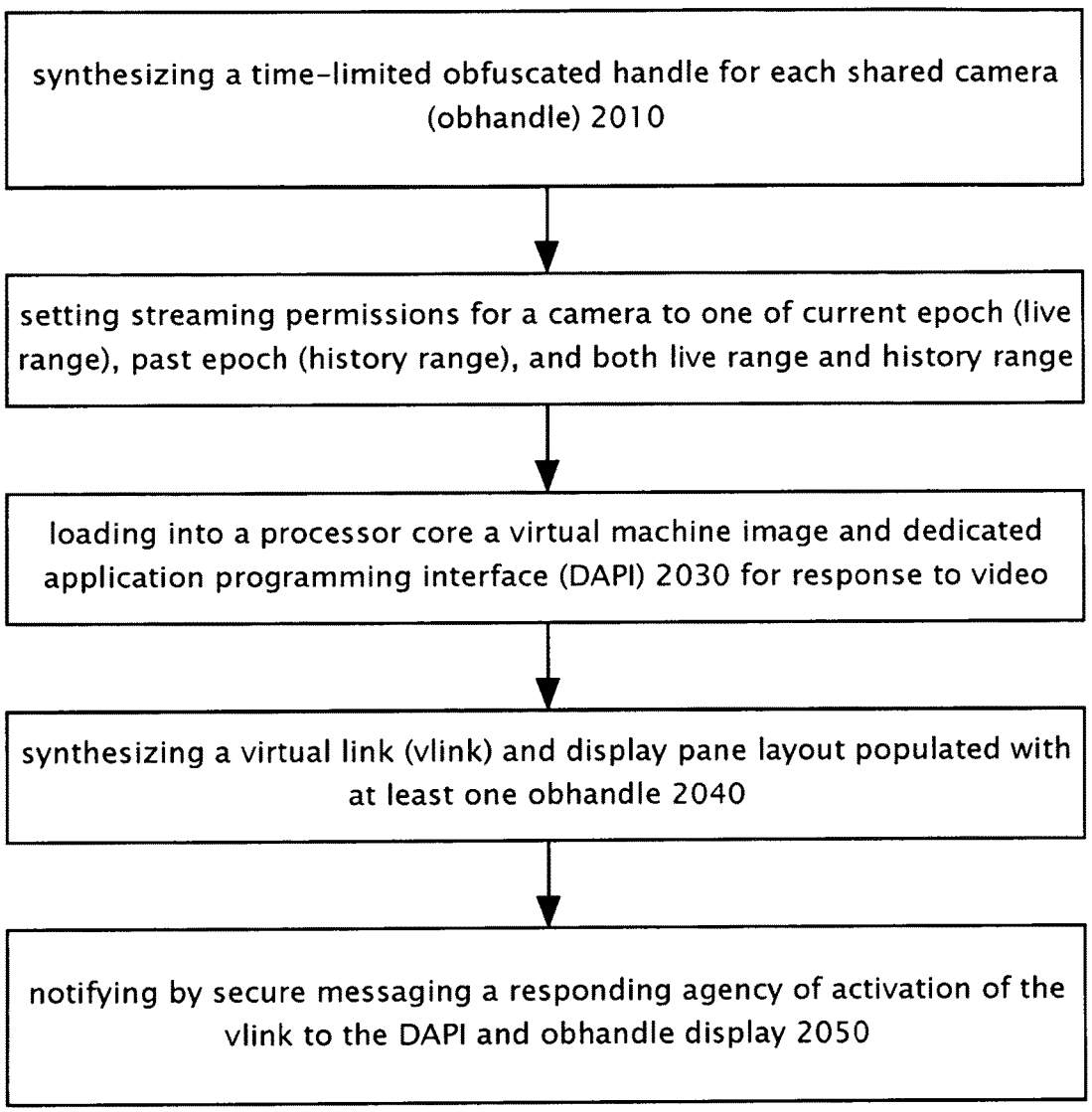
FIG. 20 is a flowchart for a further method embodiment for operation of a surveillance system video server.

Referring to FIG. 20, the method for operation of a surveillance system video server further includes:
synthesizing a time-limited obfuscated handle for each shared camera (obhandle) 2010;
setting streaming permissions for a camera to one of current epoch (live range), past epoch (history range), and both live range and history range 2020;

loading into a processor core a virtual machine image and dedicated application programming interface (DAPI) 2030 for response to video stream requests from a specific responding agency;

synthesizing a virtual link (vlink) and display pane layout populated with at least one obhandle 2040; and notifying by secure messaging a responding agency of activation of the vlink to the DAPI and obhandle display 2050.

One aspect of the invention is a system for sharing private video streams with first responders, the system including: a first responder pre-designation selection subsystem means for selection of cameras, epochs, and meta data for sharing, designation by facility administrator of deputies (Activators) authorized to activate first responder video feed, and designation of which first responder agencies are nominated to receive shared camera feed; a closed loop confirmation subsystem means for invitation/nomination to enroll, acceptance and enrollment, transmission of executable mobile viewer application code, and installation in wireless mobile displays; an activation subsystem means for notification of activation, focus on specific cameras selected by Activator, and communication of emphasis on said specified camera; and a responder subsystem means for presentation and authentication such as by password and user identity at a login form, submission of a request for authorized camera feeds, reception of meta data for display or configuration, reception of a live video feed from a shared camera, reception of a video history with navigation control, and automatic camera feed selection upon motion detection.

Another aspect of the invention is an apparatus for sharing private video streams, the apparatus including: a permissions controller for a plurality of cameras (controller); the controller remotely coupled to a facility administrator console, a video stream server (video server); the controller further coupled to the video stream server, and a responding agency account manager circuit (manager), the manager remotely coupled to at least one browser, and coupled to the video stream server.

In an embodiment the apparatus also includes: a video stream receiver (receiver); the receiver remotely coupled to a plurality of cameras. In an embodiment the apparatus also includes: a video stream store (video store); the video store coupled to the receiver. In an embodiment, the manager is; a circuit to receive and validate a password and user identity for a responding agency. In an embodiment the apparatus also includes: a circuit to receive commands from a facility administrator to set and reset a camera for sharing.

In an embodiment the apparatus also includes: a circuit to receive commands from a facility administrator to set permission for at least one of live streaming and history streaming.

In an embodiment the apparatus also includes: a circuit to format a webpage having window frames populated with identifiers of shared cameras; and a circuit to receive at least one request from a remote browser to transmit at least one video image of a shared camera.

In an embodiment, the permissions controller includes: stored values of meta data of the camera; and stored values streaming permission for live and for history.

In an embodiment, the video stream server includes: a circuit to receive navigation commands from the browser; a circuit to search forward or backward in time of recordation of the video stream; and a circuit to transmit at least one video frame according to navigation commands.

Another aspect of the invention is a method for operation of a surveillance system video server, the method including: receiving an authentication credential from a mobile video display; verifying the authentication credential is bound to a responding agency; reading stored parameters and permissions for at least one shared camera; initiating a video streaming service for shared camera images; and, responding to requests for shared camera images from the mobile video display according to stored permissions.

In an embodiment, the method for operation of a surveillance system video server also includes: transforming stored video images into a format suitable for transmission on a mobile video display; and transmitting displayable images to the requestor.

In an embodiment, the method for operation of a mobile video display includes: receiving a notification message from facility administrator; and submitting credentials to a surveillance service data center, wherein credentials are a password and user identity.

In an embodiment, the method for operation of a mobile video display also includes: getting a stream of video images recorded beginning at a point in time of permission setting at a mobile video display. As is known "getting" refers to transmitting a command to a server to elicit a file transfer such as by the http command syntax "get".

In an embodiment, the method for operation of a mobile video display also includes: getting a stream of video images recorded prior to a point in time of permission setting at a mobile video display.

In an embodiment, the method for operation of a mobile video display also includes: getting displayable static meta data about a camera at a mobile video display.

In an embodiment, the apparatus also includes: a video stream cache and store; a responding agency authentication circuit and credential store; a shared camera permissions circuit to enable streaming metadata and images over a range of time for each shared camera; a circuit to request a geo-identifier from an authenticated responding agency video display; a store of blacklist and whitelist geo-identifiers (geo-store); a circuit to initiate a consequence after comparing the geo-store with a geo-identifier received from a mobile wireless video display.

In an embodiment, the method also includes: upon determining an emergency condition, selecting at least one camera for exposure to responding agencies; setting permissions for at least one camera to video streaming for a period of time beginning before, ending after, or including the current time of setting; transmitting by secure message to the responding agency a secure link to the video stream server; whereby the responding agency is notified to request streaming from the selected camera(s), receiving a request from a secure browser; authenticating a user by an authentication credential, in an embodiment an authentication credential is a password; inspecting a request to determine a geo-identifier of the mobile video display; recording to a store a geo-identifier for each mobile video display; and checking recorded geo-identifiers for consistency with responding agency's owned equipment, wherein a geo-identifier is one of a GPS coordinate, a LCID, an IPv6 address, a Wi-Fi access point, a Bluetooth beacon, a messaging host server, and an IMEI number.

In an embodiment, reference to a camera is hidden by obfuscated camera handle or identifier i.e. obhandles. Malicious recording and replaying requests for video streams without the assistance of the administrator could fail due to expired obhandles In an embodiment, the method also includes: a plurality of virtual machine images with dedicated application programming interface instructions encoded in a computer-readable non-transitory store (vmstore); a plurality of processor cores (cores) coupled to said vmstore; a shared memory store; a video streaming processor coupled by interprocess communication (IPC) to said cores through the shared memory store; a camera control circuit to record parameters for each camera and permissions for video streams requested by obfuscated camera handles (obhandles); a responding agency authentication credential store; and, an agency notification circuit to generate and transmit virtual links to virtual machines and window layouts with obhandles.

In an embodiment, the method also includes: synthesizing a time-limited obfuscated handle for each shared camera (obhandle); setting streaming permissions for a camera to one of current epoch (live range), past epoch (history range), and both live range and history range; loading into a processor core a virtual machine image and dedicated application programming interface (DAPI) for response to video stream requests from a specific responding agency; synthesizing a virtual link (vlink) and display pane layout populated with at least one obhandle; and notifying by secure messaging a responding agency of activation of the vlink to the DAPI and obhandle display.

CONCLUSION

The invention can be easily distinguished from conventional video surveillance systems, apparatus, and methods by a facility administrator who has the option to pre-designate first responders which can receive immediate real-time security camera access during emergency situations; the cameras are shared only when an administrator activates first responder access.

The invention can be easily distinguished from conventional video surveillance systems by providing immediate situational awareness which can be crucial when there are intruders, a fire, or other situations. The insights that first responders gain from the clear, deep visibility can directly impact their actions—from necessary evacuations, to the specific protective measures they might take.

The invention can be easily distinguished from conventional video surveillance systems by giving Public Safety Officers the ability to share live video surveillance cameras on smart phones during an emergency.

The invention can be easily distinguished from conventional video surveillance systems by providing a coordinated visibility component into emergency decision making.

The invention can be easily distinguished from conventional video surveillance systems both by equipping local first responders with critical, real-time insights in the event of an emergency situation—while still retaining full daily privacy.

The invention can be easily distinguished from conventional video surveillance systems by a pre-designated list of first responders who will be authorized to view the video during emergencies. They will also authorize specific internal personnel to be capable of activating the emergency video feed.

The invention can be easily distinguished from conventional video surveillance systems by activation only during emergencies. Following set up, the video streams will continue to be private—only accessible by the organization—until authorized personnel activate the video access. Once the emergency video access is enabled, all designated first responders can view video from any major web browser or a secure mobile app.

The invention can be easily distinguished from conventional video surveillance systems by an option to identify specific cameras for the first responders to view. All designated first responders will receive an email which includes direct links to the specified cameras.

The invention can be easily distinguished from conventional video surveillance systems by force touch activation. If an authorized person is facing direct danger with insufficient time to launch the application, they can use "force touch" on the application icon on their phone, plus one confirming tap. This will enable first responder access to the cameras.

The invention can be easily distinguished from conventional video surveillance systems by an open RESTful cloud video API to allow the organization's physical security teams to integrate the first responder video emails and access with emergency notification systems they may have in place for first responders The claimed subject matter is easily distinguished from ongoing user permission setting to file access. The claimed subject matter is easily distinguished from unauthorized access to cameras attached directly to a public network at obscure IP addresses. The activation of the video streams begins a collaborative environment among responders, their supervisors, and other responding agencies. The claimed subject matter is easily distinguished from conventional video security systems which generally store images for after the event analysis. Generally, privately owned and installed security assets are not accessible to government agencies except under court order. Privacy and property interests inhibit availability of images on private property.

Having described certain embodiments of methods and systems for distributing access credentials to video streams, it will now become apparent to one of skill in the art that other embodiments incorporating the concepts of the disclosure may be used. Therefore, the disclosure should not be limited to certain embodiments, but rather should be limited only by the spirit and scope of the following claims.

The invention claimed is:

1. An apparatus for sharing private video streams with first responders comprising:
   a permissions controller for a plurality of cameras (controller); the controller remotely coupled to a facility administrator console;
   a video stream server (video server); the controller further coupled to the video stream server;
   a responding agency account manager circuit (manager), the manager remotely coupled to
   at least one browser, and coupled to the video stream server;
   a video stream cache and store;
   a responding agency authentication circuit and credential store;
   a shared camera permissions circuit to enable streaming metadata and images over a range of time for each shared camera;
   a circuit to request a geo-identifier from an authenticated responding agency video display;
   a store of blacklist and whitelist geo-identifiers (geo-store); and
   a circuit to initiate a consequence after comparing the geo-store with a geo-identifier received from a mobile wireless video display, the circuits, stores, and cache mutually coupled.

2. The apparatus of claim 1 further comprising:
   a plurality of virtual machine images with dedicated application programming interface instructions encoded in a computer-readable non-transitory store (vmstore);

a plurality of processor cores (cores) coupled to said vmstore;

a shared memory store;

a video streaming processor coupled by interprocess communication (IPC) to said cores through the shared memory store;

a camera control circuit to record parameters for each camera and permissions for video streams requested by obfuscated camera handles (obhandles);

a responding agency authentication credential store; and, an agency notification circuit to generate and transmit virtual links to virtual machines and window layouts with obhandles.

\* \* \* \* \*